United States Patent [19]

Ono et al.

[11] Patent Number: 5,555,004
[45] Date of Patent: Sep. 10, 1996

[54] INPUT CONTROL DEVICE

[75] Inventors: Satomi Ono; Tadashi Hanajima, both of Isesaki, Japan

[73] Assignee: Hosiden Corporation, Osaka, Japan

[21] Appl. No.: 296,455

[22] Filed: Aug. 26, 1994

[30] Foreign Application Priority Data

| Aug. 30, 1993 | [JP] | Japan | 5-214317 |
| Jun. 15, 1994 | [JP] | Japan | 6-133138 |
| Jun. 15, 1994 | [JP] | Japan | 6-133139 |
| Jun. 15, 1994 | [JP] | Japan | 6-133140 |
| Jun. 15, 1994 | [JP] | Japan | 6-133141 |
| Jun. 17, 1994 | [JP] | Japan | 6-135534 |
| Jun. 21, 1994 | [JP] | Japan | 6-138878 |

[51] Int. Cl.⁶ ........................... G09G 5/08
[52] U.S. Cl. ................ 345/161; 345/156; 74/471 XY; 200/6 A
[58] Field of Search ........................ 345/161, 157, 345/156; 237/148 B, 438; 74/471 XY; 200/6 A

[56] References Cited

U.S. PATENT DOCUMENTS

| 3,005,055 | 10/1961 | Mattke | 200/6 A |
| 4,246,452 | 1/1981 | Chandler | 200/6 A |
| 4,313,113 | 1/1982 | Thornburg . | |
| 4,433,217 | 2/1984 | Griffith . | |
| 4,488,017 | 12/1984 | Lee | 345/161 |
| 4,736,191 | 4/1988 | Matzke et al. . | |
| 5,172,101 | 12/1992 | Bates | 345/156 |
| 5,278,557 | 1/1994 | Stokes et al. | 74/471 XY |
| 5,287,089 | 2/1994 | Parsons | 345/157 |

FOREIGN PATENT DOCUMENTS

| 0286388 | 10/1988 | European Pat. Off. . | |
| 0422589 | 4/1991 | European Pat. Off. | 345/157 |

*Primary Examiner*—Mark R. Powell
*Assistant Examiner*—Matthew Luu
*Attorney, Agent, or Firm*—Pollock, Vande Sande & Priddy

[57] ABSTRACT

A plurality of arcuate grouping contacts and a plurality of strip contacts are formed in an annular array in opposed spaced relation with each other on two insulation layers. A control key is disposed in opposed position to the annular array of contacts on the side of one of the insulation layers opposite from the other of the layers, and an annular elastic member is interposed between the undersurface of the control key and the annular array of contacts whereby a portion of one of the insulation layers is displaced toward the other of the insulation layers depending upon the direction and magnitude of a force applied to the control key to bring the grouping contacts corresponding to the direction of the force into contact with one or more of the strip contacts.

22 Claims, 18 Drawing Sheets

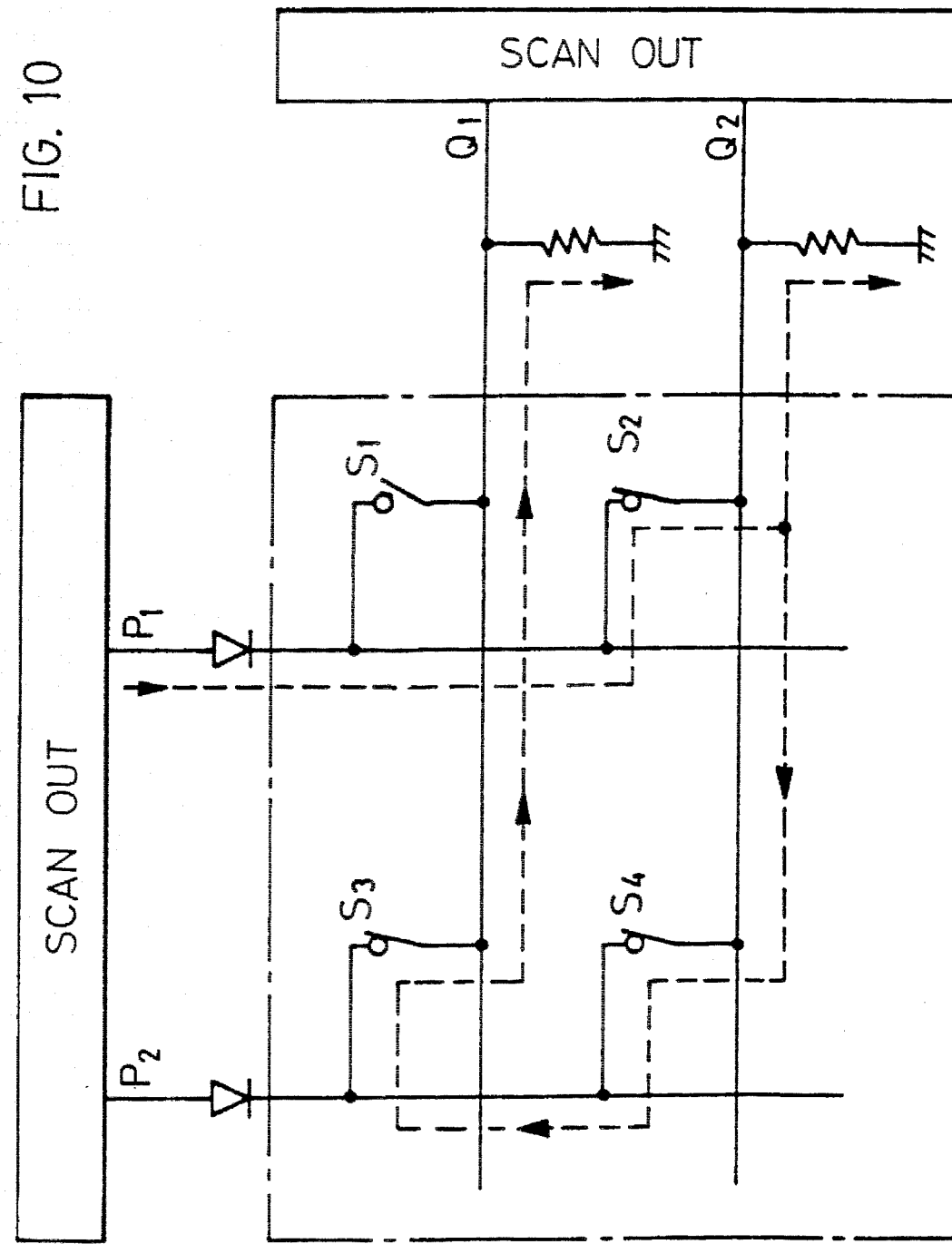

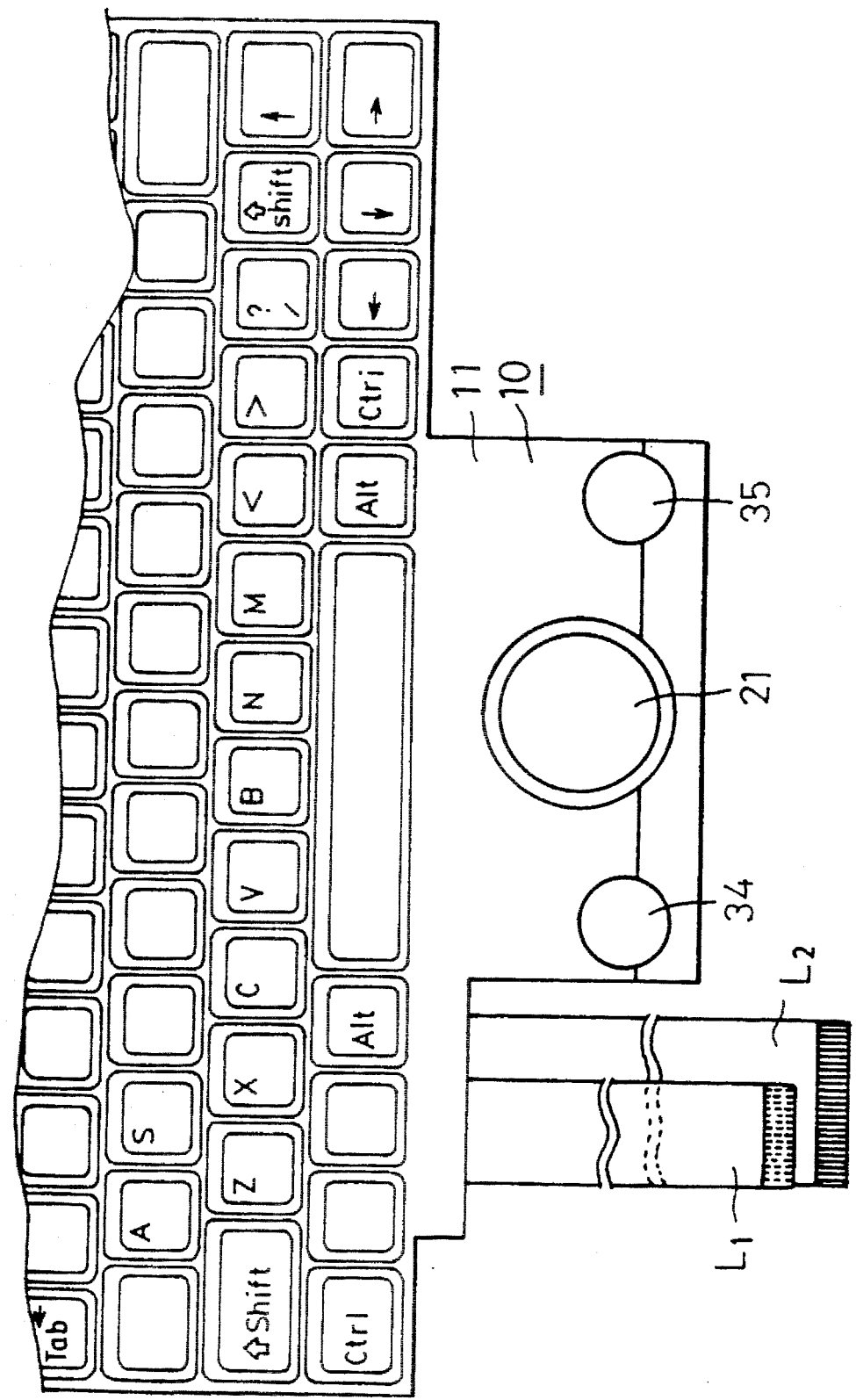

INPUT CONTROL DEVICE

FIELD OF THE INVENTION

This invention relates to an input control device for inputting signals that control the direction and speed of movement of a cursor on a display screen such as a mouse serving as an input control device for a computer.

BACKGROUND OF THE INVENTION

Mice or joy sticks are frequently employed as an input control device for a computer. The use of a mouse or joy stick may enhance the operability of a computer in that it permits angle signals for two directions of X and Y axes to be concurrently generated, thereby ensuring smooth movements of a cursor.

The mouse generally comprises a single spherical control member and two rotary encoders for detecting the rotation in X and Y directions, the encoders being in operative engagement with the control member to move the latter in desired directions to thereby generate angle signals for X and Y directions.

The joy stick comprises a control lever supported vertically by a console and is configured to generate angle signals as the lever is tilted in a desired direction to bring the contact located in that direction into contact with the corresponding one.

The mouse is capable of producing angle signals having a high resolution since such signals are generated by rotary encoders. It is also able to produce velocity signals depending on the speed at which the spherical control member is moved in rolling motions, whereby the speed of movement of a cursor appearing on a monitor may be varied. While the mouse is superior as an input device in these respects, the drawback thereof is the complicated and expensive implementation.

On the other hand, the joy stick has the disadvantage that it has a coarse resolution for the angular direction because no more than about 4 to 8 contacts are disposed around the control lever. An additional drawback is the inability to generate any signals corresponding to the operating speed. If velocity signals are to be generated corresponding to a force with which the lever is operated, it would be required to use expensive components such as pressure-sensitive rubber members and strain sensors, resulting in an increase in the cost of manufacture. In addition, with the arrangement in which the operating force is sensed by pressure-sensitive rubber members or strain sensors to produce velocity signals, the sensed signals will be output as analog signals. However, such analog signals must be passed through an A/D converter before they can be input to a computer, causing a further increase in the cost.

SUMMARY OF THE INVENTION

Accordingly, it is an object of this invention to provide an improved input control device which is inexpensive to manufacture and yet capable of providing velocity signals as well as angle signals with a high resolution.

Briefly stated, this invention provides an input control device comprising:

a first insulation surface and a second insulation surface disposed in opposed position to the first insulation surface so as to be movable toward selective portions of the first insulation surface;

M arcuate grouping contacts arranged selectively on the first and second insulation surfaces in an annular array on the same circle, M being integers equal to or greater than 2;

M groups of strip contacts disposed in opposed position to said corresponding M arcuate grouping contacts and arranged selectively on the first and second insulation surfaces on said circle, each group containing a plurality of the strip contacts;

a control key means disposed in opposed relation with said circle on the side of said second insulation surface opposite from said first insulation surface, said control key means being responsive to an operating force applied thereto to move a portion of the second insulation surface toward the first insulation surface depending on the direction and magnitude of the force to thereby bring at least one of said grouping contacts corresponding to the direction of the force into contact with one or more of said strip contacts depending on the magnitude of the force; and elastic means for providing an elastic force in opposition against the operating force applied to the control key means, said elastic force acting to press a portion of the second insulation surface against the first insulation surface.

It is thus possible to generate velocity signals as well as angle signals by arranging grouping contacts and a multiplicity of narrow strip contacts in opposed relation with each other in an annular array such that one of the grouping contacts lying in any desired angular position may be moved into contact with one or more of the strip contacts. It is to be appreciated that angle signals having a higher resolution with respect to the circumferential direction may be obtained if the width of each strip contact is reduced so as to correspondingly increase the number of strip contacts annularly arrayed on a given circle.

BRIEF DESCRIPTION OF THE DRAWINGS

FIG. 10 is a fragmentary diagram of a matrix circuit illustrating the ghost key in a switch matrix;

FIG. 19 is a plan view of a keyboard in the extension of which the input control device is incorporated;

DETAILED DESCRIPTION OF THE PREFERRED EMBODIMENTS

Figure 1:
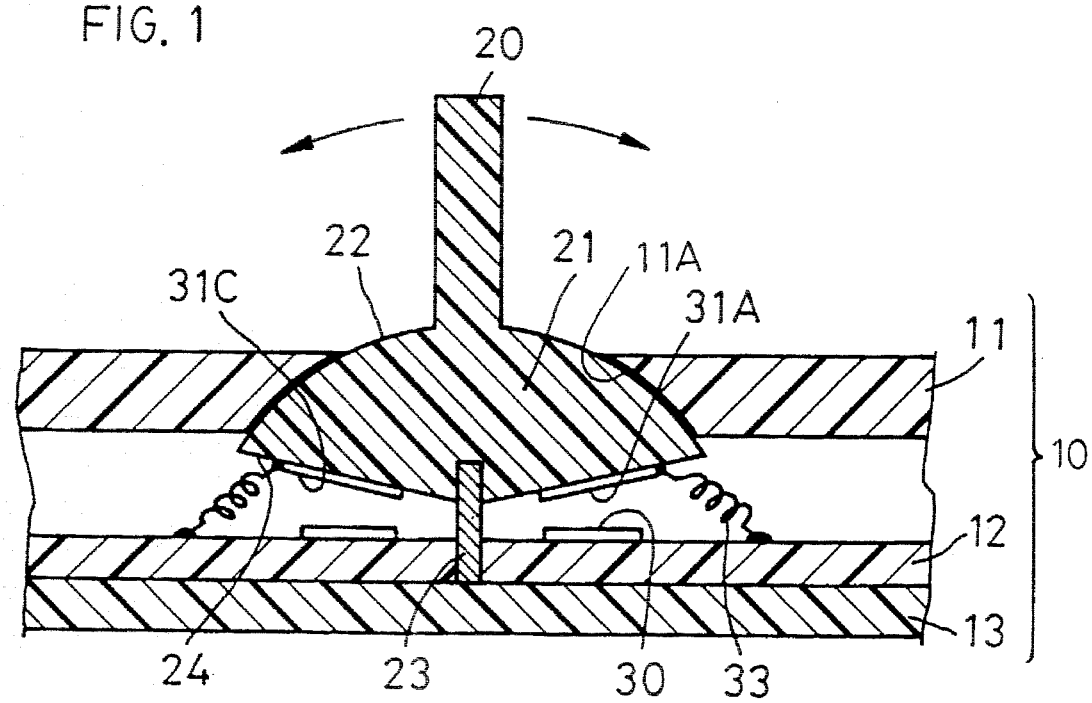
FIG. 1 is a cross-sectional view of one embodiment of the input control device according to this invention.

Referring to the drawings, wherein like numerals indicate like elements throughout all the drawings, there is shown in FIGS. 1 through 4 a first embodiment of the input control device according to one aspect of this invention. A control lever 20 is supported in a vertical orientation by a console 10 such as a keyboard which may comprise a top panel 11, a printed circuit board 12 and a backing plate 13.

An elastic control element 21 has a spherical top surface 22 and a conical bottom surface 24, the control lever 20 upstanding from the center of the spherical surface 22. The top panel 11 is formed with an aperture which defines an annular concave surface 11A closely mating with the spherical surface 22. The diameter of the top portion of the aperture adjacent the upper surface of the panel 11 is substantially greater than the diameter of the lever 20 and substantially smaller than the maximum diameter of the spherical surface 22.

The spherical surface 22 of the control element 21 is in slidable engagement with the aperture formed in the top panel 11, and the control element 21 is anchored to the printed circuit board 12 by a flexible or elastic anchor 23 as in the form of a rod fitted at one end into the center of the undersurface of the control element 21 and at the other end planted in the printed circuit board 12, whereby the control element 21 is flexibly supported so as to be tiltably moved by means of the control lever 20.

Figure 2A:
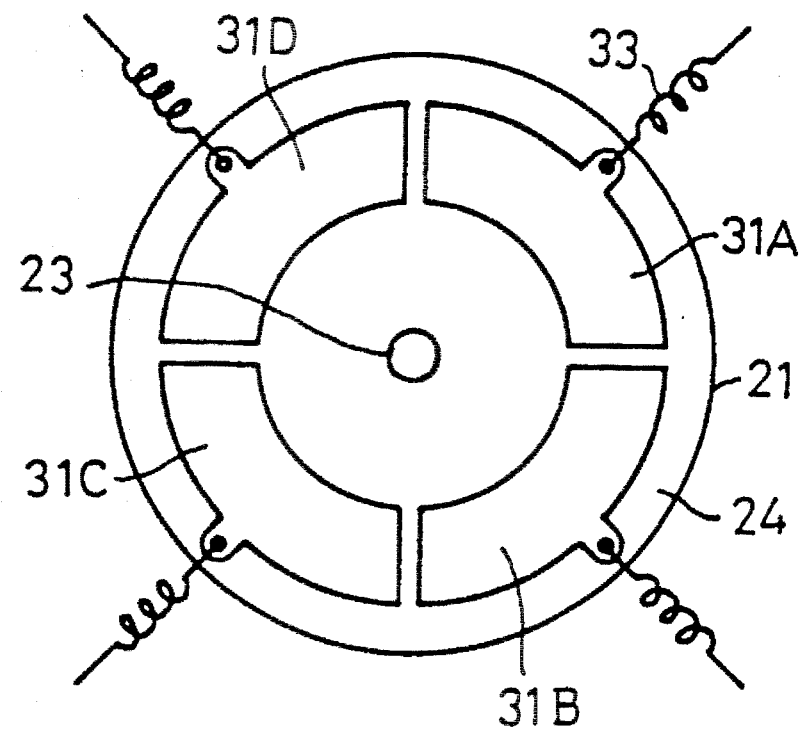
FIG. 2A is a plan view illustrating the array of strip contacts in FIG. 1.
Figure 2B:
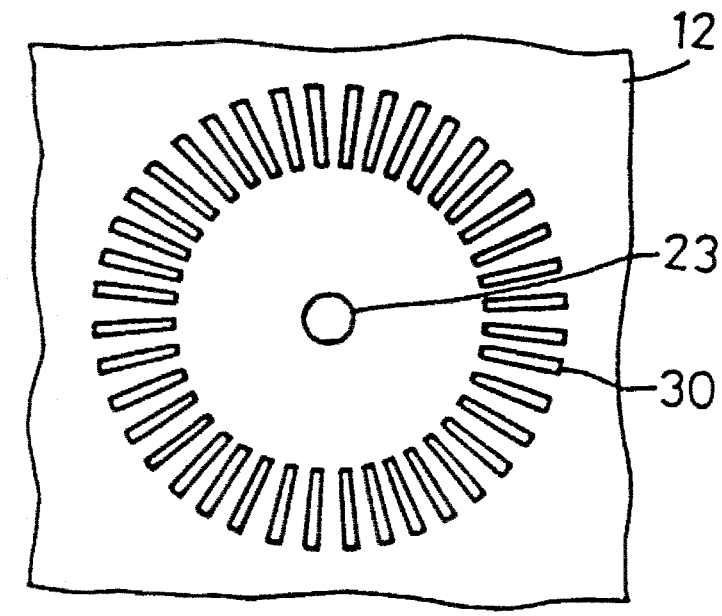
FIG. 2B is a plan view illustrating the array of grouping contacts to effectively divide the strip contacts in FIG. 2A into four groups.

The control element 21 and control lever 20 may be made of insulating resin material in one piece. As shown in a plan view in FIG. 2A, four arcuate grouping contacts 31A–31D comprising a ring plate divided in four arcuate segments each defining an equal arc of about 90° are formed in the conical bottom surface 24 around the axis of the cone. Provided in the printed circuit board 12 in opposed relation with the grouping contacts arrayed in a ring are a multiplicity of, say 20 to 40 circumferentially equally spaced strip contacts 30 of equal length extending radially around the axis of the elastic anchor 23, as illustrated in FIG. 2B.

In the illustrated embodiment the four grouping contacts 31A–31D are arranged in opposed relation with the respective four groups of strip contacts 30, the four groups being divided with respect to a predetermined position such that each group is sprayed through an arc of about 90°.

With no operating force applied to the control lever 20, the control element 21 is held in its neutral position by the elastic anchor 23 in which all the opposed contacts are in disengaged OFF position. As the control lever 20 is tilted in a desired direction with a desired force against the resilient force of the elastic anchor 23, a corresponding one of the grouping contacts 31A–31D is brought into contact with a number of the strip contacts 30 depending on the magnitude of the applied force. Each of the grouping contacts 31A–31D are arranged to be engageable with only the strip contacts 30 of the corresponding one group. In the case where strip contacts 30 are provided at equal intervals of 9° as in the illustrated embodiment, if the arrangements are such that when any one of the grouping contacts 31A–31D comes into contact with a plurality of serial strip contacts 30 in a straddling manner the tilted direction of the control element is determined as being in a direction aligned with the middle one of the serial contacts, it will be possible to discriminate between 40×2 directions as a resolution capability.

Connection between the strip contacts 30 and another circuit may be accomplished by means of wiring conductors formed in the printed circuit board 12. In contrast, electrical connection for the grouping contacts 31A–31D is shown in the illustrated embodiment as being made by connecting them with the printed circuit board 12 through leads 33 because of the control element 21 being movable.

The strip contacts 30 are arrayed at equal intervals in a ring along a certain circle so as to extend radially, and may be on the order of 20 to 40 in number. The grouping contacts 31A–31D formed on the conical bottom surface 24 are disposed in opposed relation with corresponding groups of strip contacts 30 to thereby divide, in effect, the strip contacts into a plurality of groups. Specifically, the grouping contacts 31A–31D are divided into four equal parts, each extending through about 90° such that each of the grouping contacts is in facing relation with ten of the strip contacts 30 to thereby divide, in effect, the forty strip contacts 30 into four groups each containing ten contacts.

Figure 3:
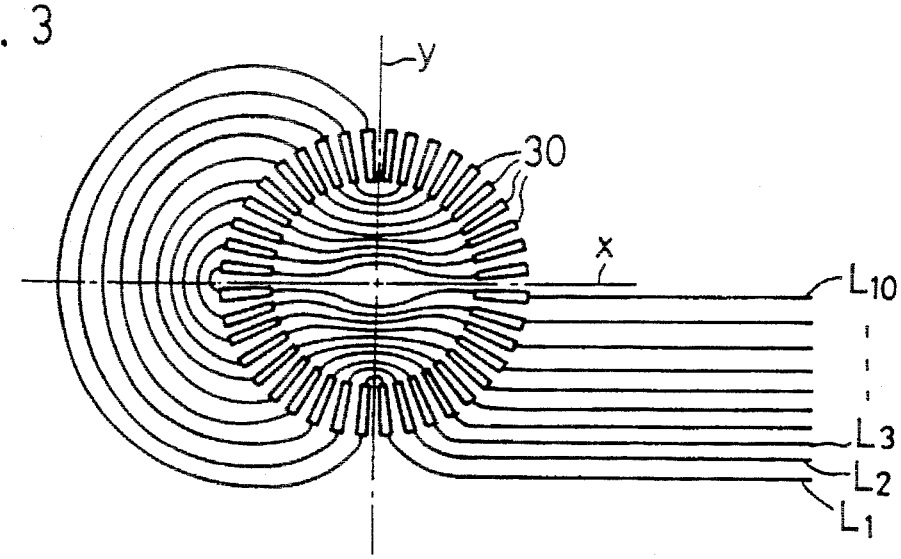
FIG. 3 is a diagram showing the wiring for the strip contacts in FIG. 2A.

The manner in which the strip contacts 30 divided in four groups by the grouping contacts 31A–31D are connected with each other will be described with reference to FIG. 3. Assuming that the strip contacts 30 shown in FIG. 3 are divided into four groups by orthogonal x and y axes, those of the strip contacts 30 which are superposed one on another if the array of the contacts is folded back with the x axis as an axis of symmetry as well as those of the strip contacts superposed one on another if the array is folded back with the y axis as an axis of symmetry are electrically connected with each other by common connecting lines $L_1$–$L_{10}$. The common connecting lines $L_1$–$L_{10}$ leading out from the groups of the strip contacts 30 as well as the leads 33 leading out from the grouping contacts 31A–31D are formed on the printed circuit board 12.

Figure 4:
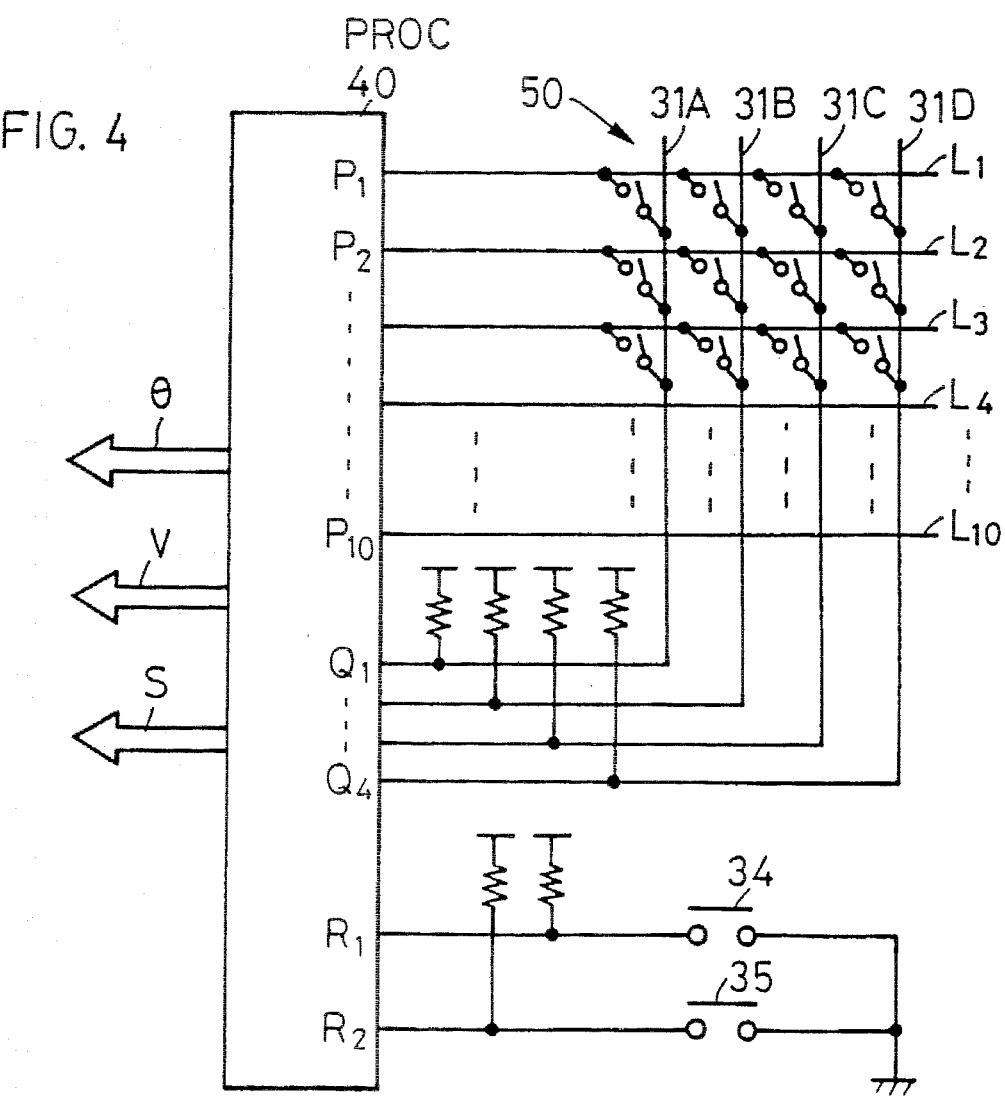
FIG. 4 is a diagram of a switch matrix comprising the grouping contacts in FIG. 2B and the contact connections in FIG. 3.

A matrix switch circuit 50 as illustrated in FIG. 4 may be constituted by combining the grouping contacts 31A–31D with the common connecting lines $L_1$–$L_{10}$ which establish connections between the four groups of strip contacts 30 divided by the grouping contacts 31A–31D in the manner as explained with reference to FIG. 3. Such a switching circuit may comprise a set of switches adapted to make and break contact between the grouping contacts 31A–31D and the strip contacts 30 as the control lever 20 is operated in a desired direction through 360°.

The arithmetic processing of the inputs provided by the depressing operation by the control key 21 will now be described with reference to FIG. 4. To this end, an arithmetic processor comprising a microcomputer 40 is provided. Terminals $P_1$–$P_{10}$ and $Q_1$–$Q_4$ are scan-out terminals and scan-in terminals, respectively, for the matrix switch circuit 50, and $R_1$ and $R_2$ are condition setting input terminals. Symbols θ, V and S represent angle signals, velocity signals and condition setting signals, respectively. The processor 40 repeats a fixed cycle of delivering pulses successively to the terminals $P_1$–$P_{10}$ (scan out), and determines to which of the terminals $Q_1$–$Q_4$ pulses are input via the switch matrix 50 (scan in). It can be found out which switch has been turned on by finding the terminal that delivered a pulse and the terminal at which the pulse was detected in response to the delivery of the pulse.

The direction in which the control key 21 has been operated may thus be determined by computing the combination of the grouping contacts 31A–31D and the strip contacts 30 leading to the common connecting lines $L_1$–$L_{10}$ between which contact has been made in response to the depressing operation by the control key 21. For example, upon contact being made between the grouping contact 31A and the strip contact 30 leading to the common connecting line $L_1$, the scan-out terminal $P_1$ and the scan-in terminal $Q_1$ are interconnected, the connection between which is recognized by the processor 40. When contact is established between the grouping contact 31D and the strip contact 30 leading to the common connecting line $L_{10}$, the scan-out terminal $P_{10}$ and the scan-in terminal $Q_4$ are interconnected, the connection between which is recognized by the processor 40. When one of the grouping contacts comes into contact with two adjoining strip contacts 30, two of the scan-out terminals P and one of the scan-in terminals Q are interconnected, the two connections being recognized by the processor 40. This is also true when one of the grouping contacts comes into contact with three adjoining strip contacts 30.

As indicated above, the combination between the grouping contacts 31A–31D and the strip contacts 30 contacted by the former corresponds to the direction in which the control key 21 is depressed. If one of the grouping contacts 31A–31D comes into contact with M (M=integers equal to or greater than 2) strip contacts 30, for example, the processor 40 produces an output assuming that the middle one of the strip contact array contacted corresponds to the direction in which the control element has been operated. When the strip contacts contacted are three in number, for example, an output is generated with the assumption that the middle strip contact corresponds to the operated direction of the control element. Concurrently therewith, the processor 40 may detect the number of the strip contacts 30 contacted by one of the grouping contacts 31A–31D and generate a velocity signal V assuming that the number of the contacts contacted corresponds to the velocity at which a cursor on the display (not shown) is to be moved in the deleted direction. For example, three different velocity signals V may be output depending on whether the number of the contacts contacted is one, two or three. The operated direction of the control lever 20 and the number of the contacts contacted as recognized by the processor 40 may be converted to electric signals matched with the communication standard on the common mouse, joy stick or other input control devices, which electric signals are output to a computer (not shown) as angle signals θ and velocity signals V.

Such signals may be utilized to control the position of a cursor appearing on the display of the computer. In this case, the operated direction of the lever corresponds to the angle signal θ representing the direction in which the cursor is to be moved while the number of strip contacts contacted corresponds to the velocity signal V representing the speed at which the cursor is to be moved.

In FIG. 4, a switch (click key) 34 is a condition setting switch for instructing a decision to be made on the location of the cursor, while a switch (click key) 35 is a condition setting switch for instructing cancellation to be made on the location of the cursor. These switches 34 and 35 are disposed somewhere in the top panel 11 separately from the control key 21. Signals responsive to the operation of the switches 34 and 35 are also transmitted from the processor 40 as condition setting signals S.

The relation between the number of strip contacts 30 contacted by the grouping contacts 31A–31D and the traveling speed of the cursor may be established as follows:

| Number of contacts contacted | Traveling speed of cursor (counts/sec.) |
|---|---|
| 1–3 | 4 |
| 3–4 | 80 |
| 5–6 | 300 |
| 7 or more | 800 |

It is here to be understood that the number of the grouping contacts 31A–31D is not limited to 4 but may be 8 or more. The number of strip contacts 30 may also be varied depending on the revolution of direction and/or the number of the grouping contacts 31.

As discussed above, the switch matrix 50 according to this invention provides a group of multiple-point input switches whereby angle signals with a high resolution can be produced.

Figure 5:
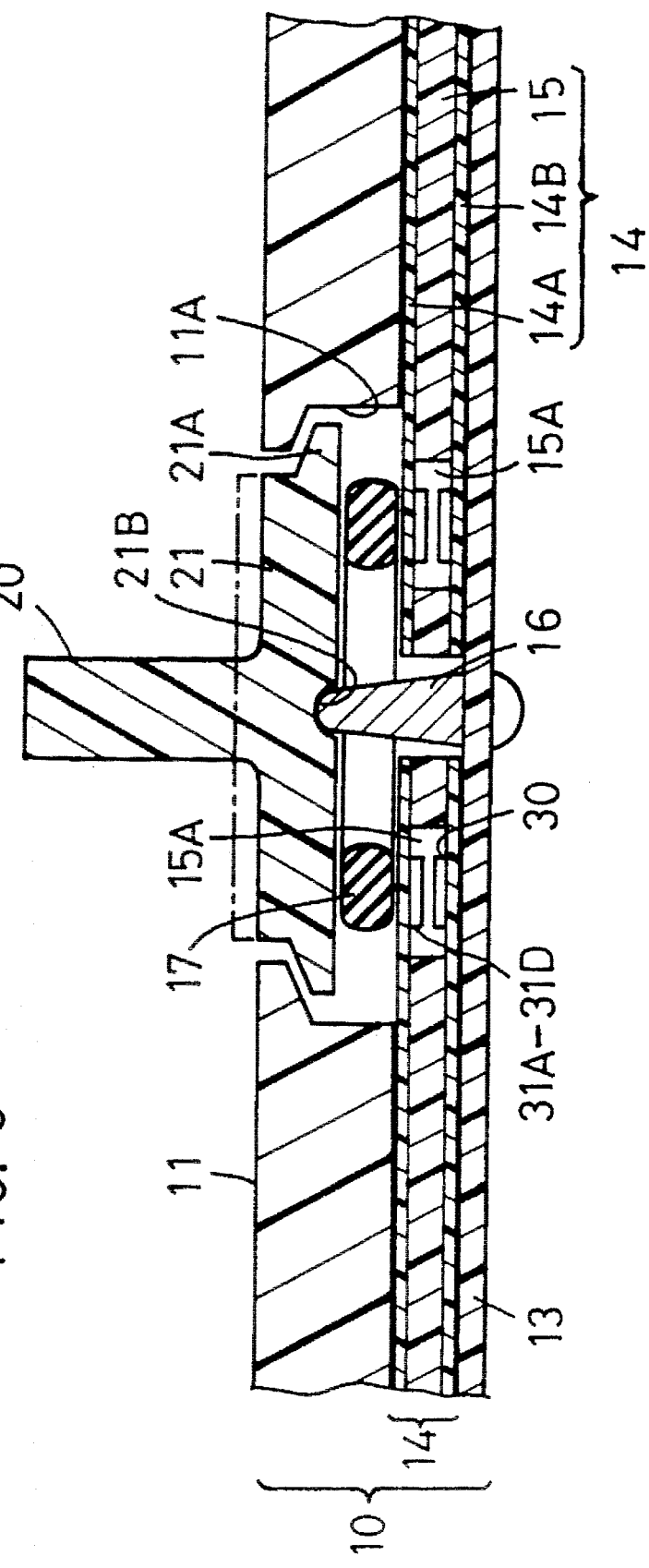
FIG. 5 is a cross-sectional view of an embodiment of the input control device utilizing membrane switches.

FIG. 5 shows a second embodiment of the input control device according to this invention in which strip contacts 30 and grouping contacts 31A–31D are integrated in membrane switches.

In FIG. 5, the reference numeral 10 is a part of a console comprising a top panel 11 and a backing plate 13. A disk-like control key 21 made of insulating resin material is accommodated in a circular opening 11A formed through the top panel 11 for tiltable movements in a plane generally coplanar with that of the front panel. A control lever 20 is formed integrally with and extending generally vertically from the center of the top surface of the control key 21.

Figure 6:
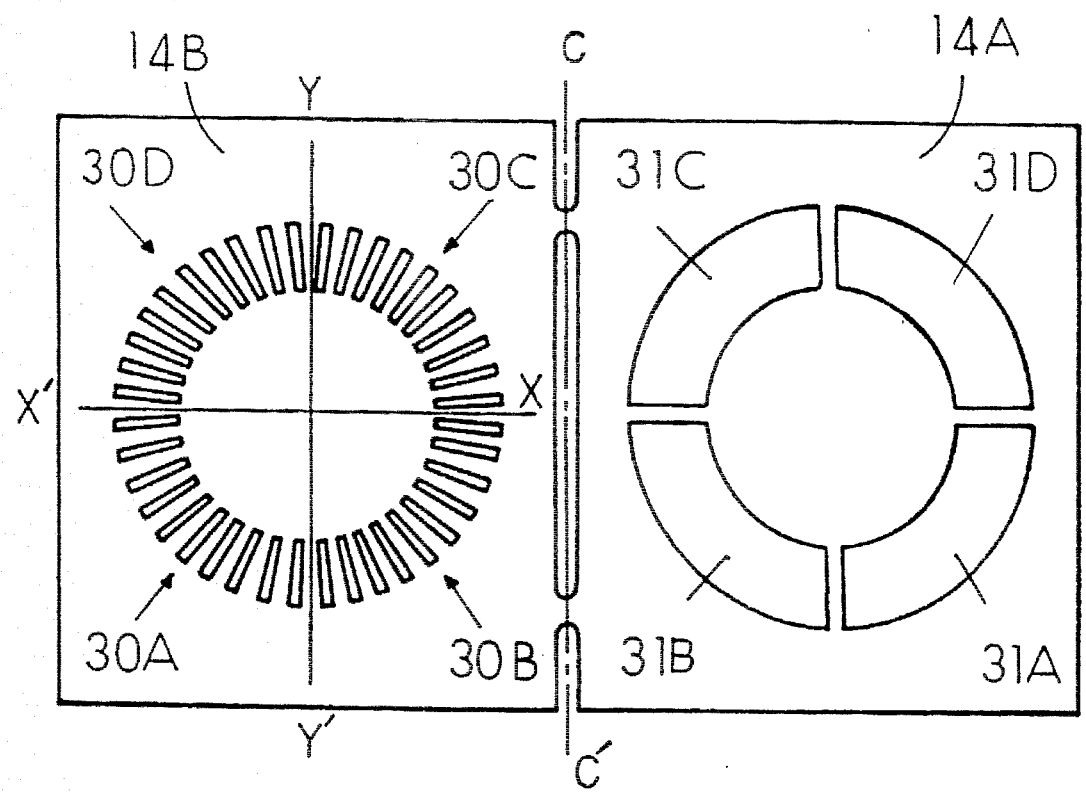
FIG. 6 is a diagram showing the contact pattern comprising the membrane switches in FIG. 5.

Arcuate grouping contacts 31A–31D and strip contacts 30 are printed on insulation layers 14A and 14B, respectively. While the configuration and arrangement of the strip contacts 30, grouping contacts 31A–31D and common connecting lines (not shown) are substantially the same as those described with respect to FIG. 2A, 2B, and 3 they are printed on a single sheet as shown in FIG. 6, which is then folded on itself in two layers with a spacer 15 sandwiched therebetween to form membrane switches. The printed insulation layers 14A and 14B are bonded to the opposite sides of the spacer 15 which is formed with an annular space 15A concentric with the circular opening 11A. The grouping contacts 31A–31D and strip contacts 30 are printed on the insulation layers 14A and 14B, respectively such that the grouping contacts 31A–31D and strip contacts 30 are in opposing relation with each other in the space 15A. The assembly comprising the insulation layers 14A and 14B bonded to the opposite sides of the spacer 15 is bonded to the backing plate 13.

The circular opening 11A increases in diameter downwardly from adjacent the top surface of the top panel 11 so as to be engageable by a peripheral rim 21A extending from the periphery of the disk-like control key 21 adjacent its undersurface to thereby prevent the control key 21 from coming off the opening 11A.

Secured to and upstanding from the backing plate 13 in concentric alignment with the axis of the circular opening 11A and the annular space 15A is a pin 16 the top end of which is in engagement with a recess 21B formed in the undersurface of the control key 21, so that as the lever 20 is operated, the control key 21 is tilted with the top end of the pin 16 as a fulcrum.

An annular elastic member 17 formed of rubber-elastic material such as synthetic rubber or synthetic resin having rubber elasticity is disposed between the undersurface of the control key 21 and that portion of the insulation layer 14A where the grouping contacts 31A–31D are formed. The annular elastic member 17 is bonded to either one of the undersurface of the control key 21 and the insulation layer 14A.

With no operating force applied to the control lever 20, the control key 21 is held in its non-tilted neutral position by the annular elastic member 17. As the control lever 20 is operated, a pressure is applied to the insulation layer 14A through the control key 21 and the annular elastic member 17, whereby a portion of one of the grouping contact 31A–31D corresponding to the direction of the depressed operation is brought into contact with the strip contacts 30.

In a modified version of the embodiment of FIG. 5, the control lever 20 may be removed from the body of the control key 21 as shown in phantom lines. In that case, the control key 21 may be directly operated on. The control key 21 may have a relatively large diameter and have its top surface extend beyond the top surface of the top panel 11. The operator may press on the control key 21 adjacent the periphery of the top surface thereof to apply a hold-down pressure to bring a desired grouping contact 31 into contact with the strip contacts 30.

With the arrangement in which a pressure is applied to the insulation layer 14A through the annular elastic member 17, the number of strip contacts 30 contacted by one of the grouping contacts 31A–31D may be controlled by the magnitude of the tilting force applied to the lever 20. That is, when a relatively great tilting force is applied, a correspondingly larger compressive pressure is imparted to the elastic member 17 to compression deform the elastic member to a correspondingly larger extent whereby a large extent of the insulation layer 14A is pressed down. As a result, one of the grouping contacts 31A–31D is brought into contact with the strip contacts 30 over a large extent, so that a relatively large number of strip contacts 30 are contacted by the grouping contact. Conversely, when a relatively small tilting force is applied to the lever 20, a correspondingly smaller number of strip contacts 30 are contacted by the grouping contact.

When the number of contacts contacted (hereinafter referred to as contacted points) is relatively large, there may occur some non-contacted points within the contacted extent of the contact array. By way of example, if there are five successive contacted points which are adjoined by two successive non-contacted points which in turn are adjoined by a one contacted point, then the two non-contacted points are deemed as contacted points and it is decided that there are eight successive contacted points as a whole. In another example, if there are four successive contacted points which are adjoined by four successive non-contacted points which in turn are adjoined by two contacted points, then the two contacted points are disregarded and it is decided that there are four successive contacted points as a whole. Reliability in operation may thus by insured by establishing a decision algorithm.

While the elastic member 17 is interposed between the control key 21 and the insulation sheet 14A, it is also conceivable to form the control key 21 itself of elastic material such as rubber. Further, the number of the grouping contacts 31A–31D is not limited to 4 but may be 8 or more. In that case it can readily be understood that the number of strip contacts 30 may also be varied accordingly.

As discussed above, according to the embodiment of FIG. 5, a group of multiple-point input switches can be formed by the switch matrix arrangement whereby an angle signal (i.e., direction signal) with a high resolution can be produced. Especially, the membrane switch arrangement as illustrated in FIG. 5 permits simplification in construction and hence reduction in manufacturing cost of the switching system.

In addition, the elastic member 17 interposed between the control key 21 and the insulation sheet 14A in the region where the switch is depressed makes it possible to control the number of strip contacts contacted to a greater degree, whereby a velocity signal can also be generated to control the traveling speed of the cursor. Moreover, the use of the membrane switch arrangement enables the input control device according to this invention to be packaged integrally with an input keyboard. It is thus to be appreciated that this invention provides an input control which is inexpensive and yet comparable in function to conventional input control means such as mice and the like, and which is very useful in practical use.

Figure 7:
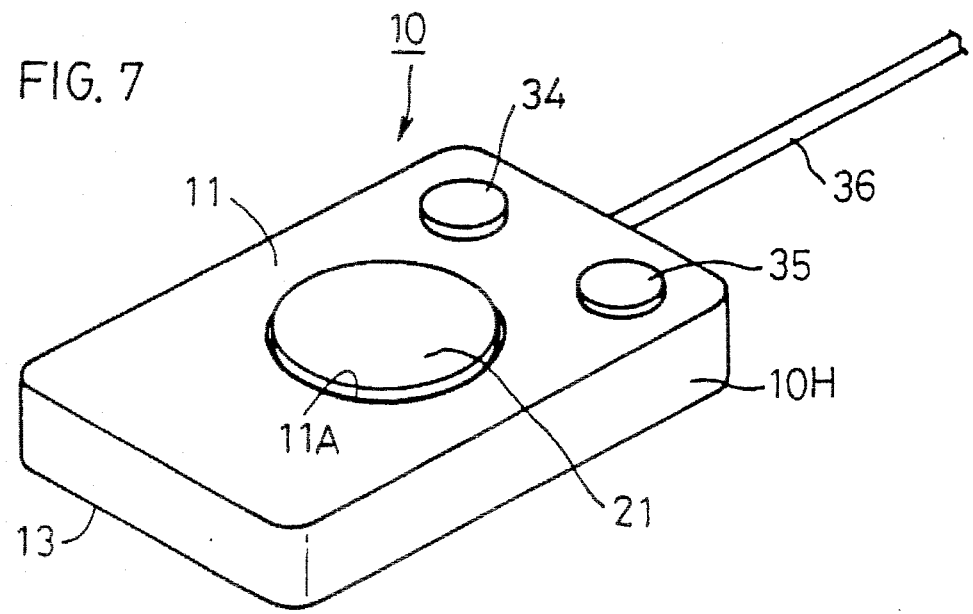
FIG. 7 is a perspective view of an entire input control device in which this invention is incorporated.

FIG. 7 is an entire perspective view of an example of the input control device incorporating the input control key 21 having no control lever as in the modified version of the FIG. 5 embodiment. The input control key 21 is disposed in the opening 11A formed through the top panel 11 defining the top wall of a housing 10H. In this example, click keys 34 and 35 are provided in the top panel 11. Mounted in the housing 10H are a switch matrix in the form of membrane switches and a processor 40, the membrane switch sheet 14 being bonded to the bottom wall of the housing 10H, none of those components being shown in FIG. 7. The processor 40 is connected via a cable 36 with a computer or its associated equipment, not shown.

In the embodiment of FIG. 5 described above, the switches formed by the grouping contacts 31A–31D and the opposing strip contacts 30 are turned on and off through the annular elastic member 17 by operating the control key 21. The thickness of the spacer 15 is shown extremely large compared to the insulation layers 14A, 14B just for the purpose of clarity. The annular elastic member 17 is in direct contact with the the insulation layer 14A comprising the membrane contact during the non-use of the control key 21. It is here to be noted that upon the depressing operation being initiated by the pressure actuator comprising the control key 21 and elastic member 17, the insulation layer 14A is depressed to bring the grouping contacts 31A–31D into contact with the strip contacts 30 because the elastic member 17 is constantly in direct contact with the the insulation layer 14A. In addition, the thicknesses of the spacer 15 and insulation layers 14A, 14B are extremely thin so that only a short stoke of travel is required of the control key 21 for actuation. Consequently, however, there is a problem with the embodiment of FIG. 5 that because the switching operation is initiated the instant the depressing operation is initiated, the operator would have no positive feeling of operation without feeling any click. A modified embodiment of the input control device which is designed to overcome this problem is illustrated in FIG. 8.

Figure 8:
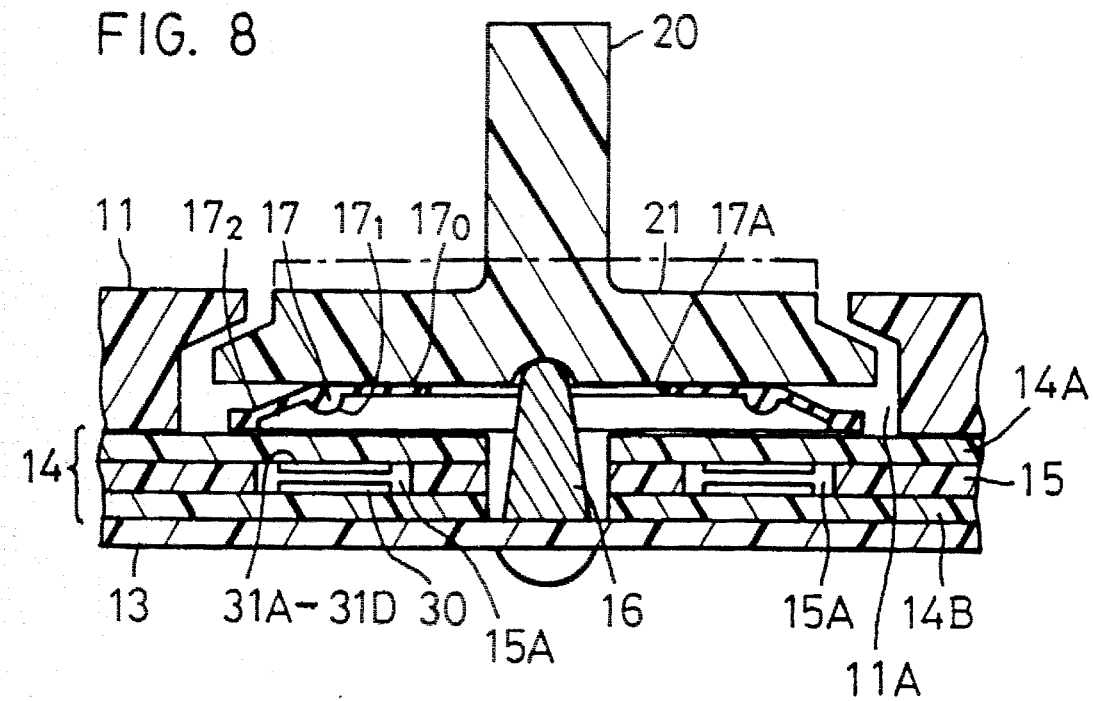
FIG. 8 is a cross-sectional view of another embodiment of the input control device utilizing membrane switches.

In FIG. 8, like reference numerals are used for those components which correspond to components in the embodiment of FIG. 5. In this embodiment an elastic member 17 having a central opening 17A and an inverted plate-like cross section is affixed to the undersurface of the control key 21, in lieu of the annular elastic member 17 having a generally rectangular cross section in FIG. 5. The elastic member 17 may be formed of a rubber-elastic material such as synthetic rubber or synthetic resin having a rubber elasticity, and comprises a flat disk portion $17_0$ having the opening 17A through which the pin 16 is passed, an annular ridge $17_1$ protruding downwardly from the undersurface of the disk portion adjacent its outer periphery, and a skirt portion $17_2$ extending outwardly and downwardly at a gradually inclined angle from the outer periphery of the disk portion $17_0$ beyond the ridge $17_1$. The outer peripheral edge or lower end of the skirt portion $17_2$ terminates within the confines of the undersurface of the control key 21 and lies axially below the lower end of the ridge $17_1$.

With no operating force applied to the control lever 20, the control key 21 is held in its neutral position. Upon the control lever 20 being tilted in a desired direction, first a portion of the lower end of the skirt portion $17_2$ abuts against the top surface of the membrane sheet 14 outside of the annular space 15A, and further depression of the lever 20 against the resilient force of the skirt portion $17_2$ brings a portion of the lower end of the ridge $17_1$ into abutment with the insulation layer 14A overlying the space 15A to press the insulation layer down, whereby one, for example, of the grouping contacts 31A–31D is brought into contact with one or more of the strip contacts 30. At the same time, the skirt portion $17_2$ in confronting relation with the membrane sheet 14 is nearly flattened, resulting in a quick drop in the axial resilient force whereupon a click is felt by the finger in touch with the control lever 20.

It should be understood that the skirt portion $17_2$ is actually in direct abutment against the insulation layer 14A in the rest position of the control key 21, although it is shown in FIG. 8 as being spaced from the insulation layer in order to clearly illustrate the various parts of the device. The annular ridge $17_1$, however, is held in spaced position from the insulation layer 14A in the rest position.

Figure 9A:
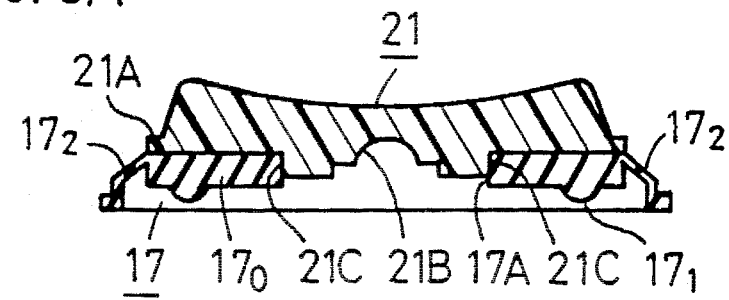
FIG. 9A is a cross-sectional view of a modified form of the control key and elastic member in the embodiment of FIG. 8.
Figure 9B:
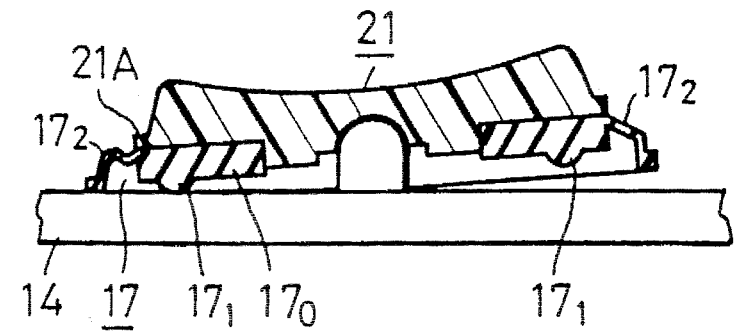
FIG. 9B is a cross-sectional view illustrating the function of the elastic member in FIG. 9A.

FIGS. 9A and 9B illustrate a modified form of the control key 21 and elastic member 17 according to the embodiment of FIG. 8. In this modified form, a thickened portion $17_0$ of an annular elastic member 17 having a circular opening 17A is seated in a complementarily shaped annular recess 21C formed in the undersurface of the control key 21, as shown. The thickened portion $17_0$ has an outer diameter substantially equal to that of the control key 21. The thickened portion $17_0$ has an annular ridge $17_1$ protruding downwardly from the undersurface thereof and an integral skirt portion $17_2$ extending outwardly and downwardly from the outer periphery thereof beyond the outer periphery of the control key 21. Again the lower end of the skirt portion $17_2$ lies below the lower end of the annular ridge $17_1$.

When the control key 21 thus constructed is depressed in operation, the lower end of the skirt portion $17_2$ is urged against the top surface of the membrane sheet 14 with the result that the skirt portion $17_2$ is bent backward or recurved at the root thereof as shown in FIG. 9B whereupon a click feeling stronger than in the embodiment of FIG. 8 is obtained.

In FIG. 9A the entire elastic member 17 including the skirt portion $17_2$ may be formed integrally with the control key 21.

It should here be pointed out that in the switching matrix 50 as shown in FIG. 4 comprising a combination of the grouping contacts 31A–31D and the strip contacts 30 as illustrated in FIGS. 2A, 2B and 3 or FIG. 6, there is the possibility that three or more switches may be simultaneously turned on in response to a pressure applied to the control key 21. When three or more switches are simultaneously turned on, signals may be output from the matrix as if one or more switches which ought not to be on were on. Such a switch is commonly called a "ghost key."

This phenomenon will be explained in more detail with reference to FIG. 10 which is focussed on the grouping contacts 31A and 31B and the common connecting lines $L_1$ and $L_2$. These contacts and lines correspond to adjoining switches $S_1$, $S_2$, $S_3$ and $S_4$ which may possibly be simultaneously turned on. FIG. 10 shows only the switch $S_1$ being off while the switches $S_2$, $S_3$ and $S_4$ are on. Conversely, however, if only the switch $S_1$ is on and if there is present a signal at the output $P_1$, that signal will appear at the input $Q_1$ whereby the switch $S_1$ is recognized as being on.

Let it here be assumed that the switches $S_2$, $S_3$ and $S_4$ were simultaneously turned on while the switch $S_1$ is off, as shown. In that case, if there is present a signal at the output $P_1$, that signal will first be passed through the switch $S_2$ and appear at the input $Q_2$, and then at the same time the signal will pass through the switch $S_4$ to the switch $S_3$ and appear at the input $Q_1$ as shown in a broken line. This is equivalent to the case where the switch $S_1$ is also on, and the switch $S_1$ becomes a ghost key.

Figure 11:
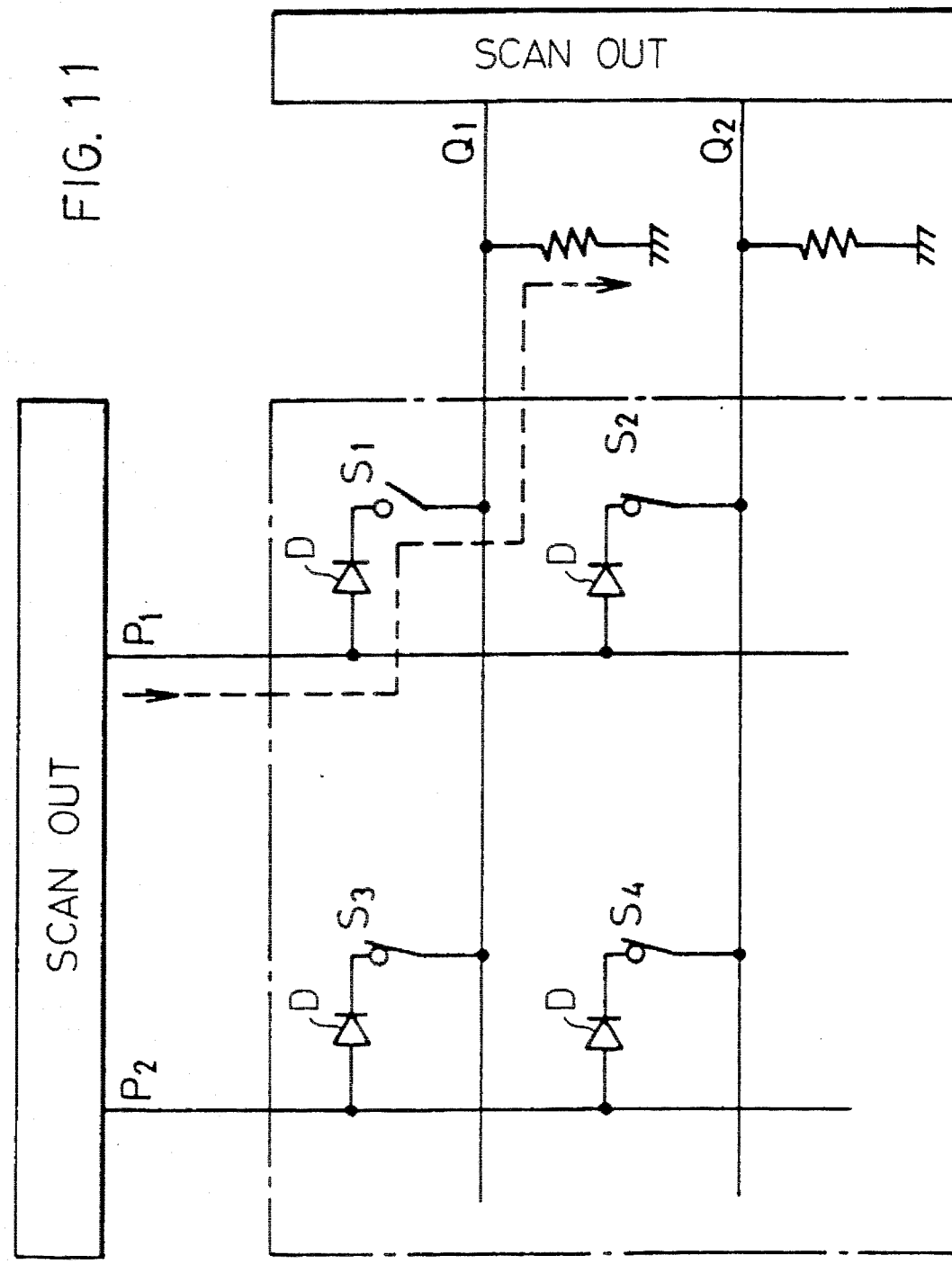
FIG. 11 is a diagram illustrating an example of the matrix circuit in which no ghost key appears.

It is possible to prevent the emergence of such ghost keys by connecting diodes D in series with the respective switches in a forward direction with respect to signals from the scan-out terminals P, as shown in FIG. 11. That is, in the event that the switches $S_2$, $S_3$ and $S_4$ are simultaneously turned on while the switch $S_1$ is off, as stated above, if there is present a signal at the output $P_1$, that signal will be passed through the switch $S_2$ to the switch $S_4$, but the diode D connected to the switch $S_4$ will block that sneak signal as it runs in a reverse direction so that the signal will ultimately not appear at the input $Q_1$.

Diodes connected in series with the respective switches would correspondingly complicate the design and construction of the input control device and hence increase the manufacturing cost.

Figure 12:
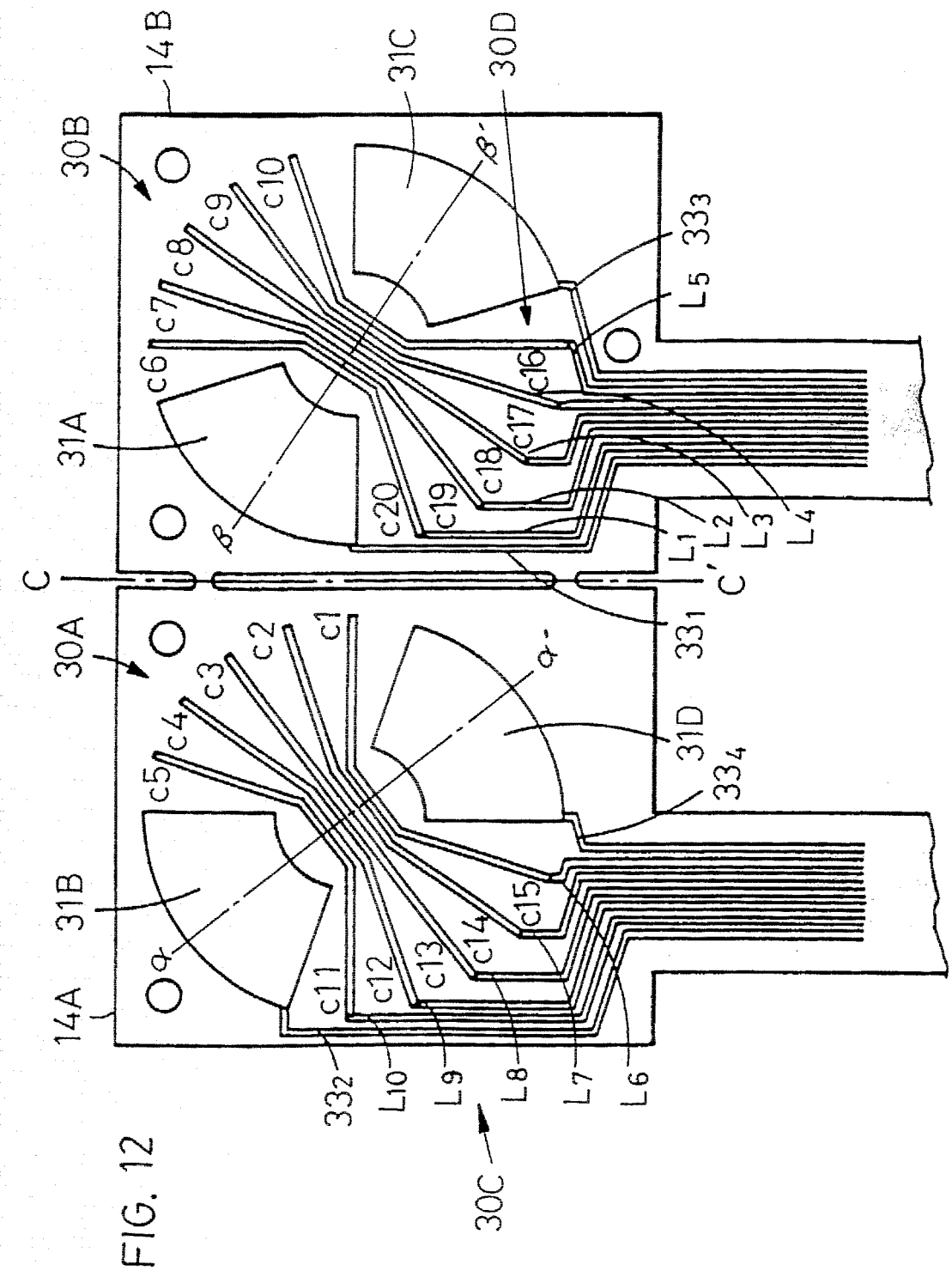
FIG. 12 is a diagram of a contact wiring pattern comprising a matrix circuit in which no ghost key appears.

FIG. 12 illustrates an embodiment of the contact arrangement designed to overcome this problem in which each of the four grouping contacts 31A–31D in the membrane switch is arranged in opposed position to a group of five strip contacts 30. This membrane switch comprises two groups 30A and 30C of strip contacts and two grouping contacts 31B and 31D formed on one insulation layer 14A, and two groups 30B and 30D of strip contacts and two grouping contacts 31A and 31C formed on the other insulation layer 14B opposed to the one insulation layer 14A. The grouping contacts 31A and 31C on the other insulation layer 14B are in opposed position to the groups 30A and 30C of strip contacts on the one insulation layer 14A while the grouping contacts 31B and 31D formed on the one insulation layer 14A are in opposed position to the groups 30B and 30D of strip contacts on the other insulation layer 14B.

Each pair of the strip contacts c1–c5 and c11–c15 symmetrically positioned with respect to a line $\alpha$–$\alpha'$ extending through the center of the annular array of contacts on the insulation layer 14A and bisecting the grouping contacts 31B and 31D are connected with each other and further connected with common connecting lines $L_6$–$L_{10}$. Likewise, each pair of the strip contacts c6–c10 and c20–c16 symmetrically positioned with respect to a line $\beta$–$\beta'$ extending through the center of the annular array of contacts on the insulation layer 14B and bisecting the grouping contacts 31A and 31C are connected with each other and further connected with common connecting lines $L_1$–$L_5$.

It should here be pointed out that the symbols c1, c2, c3, . . . affixed to the strip contacts 30 forming the switches represent the numbers of the contacts defined by the corresponding strip contacts 30. The order of the contact numbers starts with c1, proceeds counterclockwise, and terminates in c20, assuming that c1 is first depressed, that the cursor is moved incrementally counterclockwise as the depressing position is moved counterclockwise, and that a cycle of movement is completed when c20 is finally depressed. In the groups 30A and 30C of strip contacts and the groups 30B and 30D of strip contacts symmetrically positioned with respect to a line, each pair of the line-symmetrically positioned strip contacts are connected with each other. More specifically, c1–c5 are connected with c15–c11, respectively, and those pairs are connected with common connecting lines $L_6$–$L_{10}$, respectively. The strip contacts c6–c10 are connected with c20–c16, respectively, and connected with common connecting lines $L_1$–$L_5$, respectively. The grouping contacts 31A–31D are connected with leads $33_1$–$33_4$, respectively.

Figure 13:
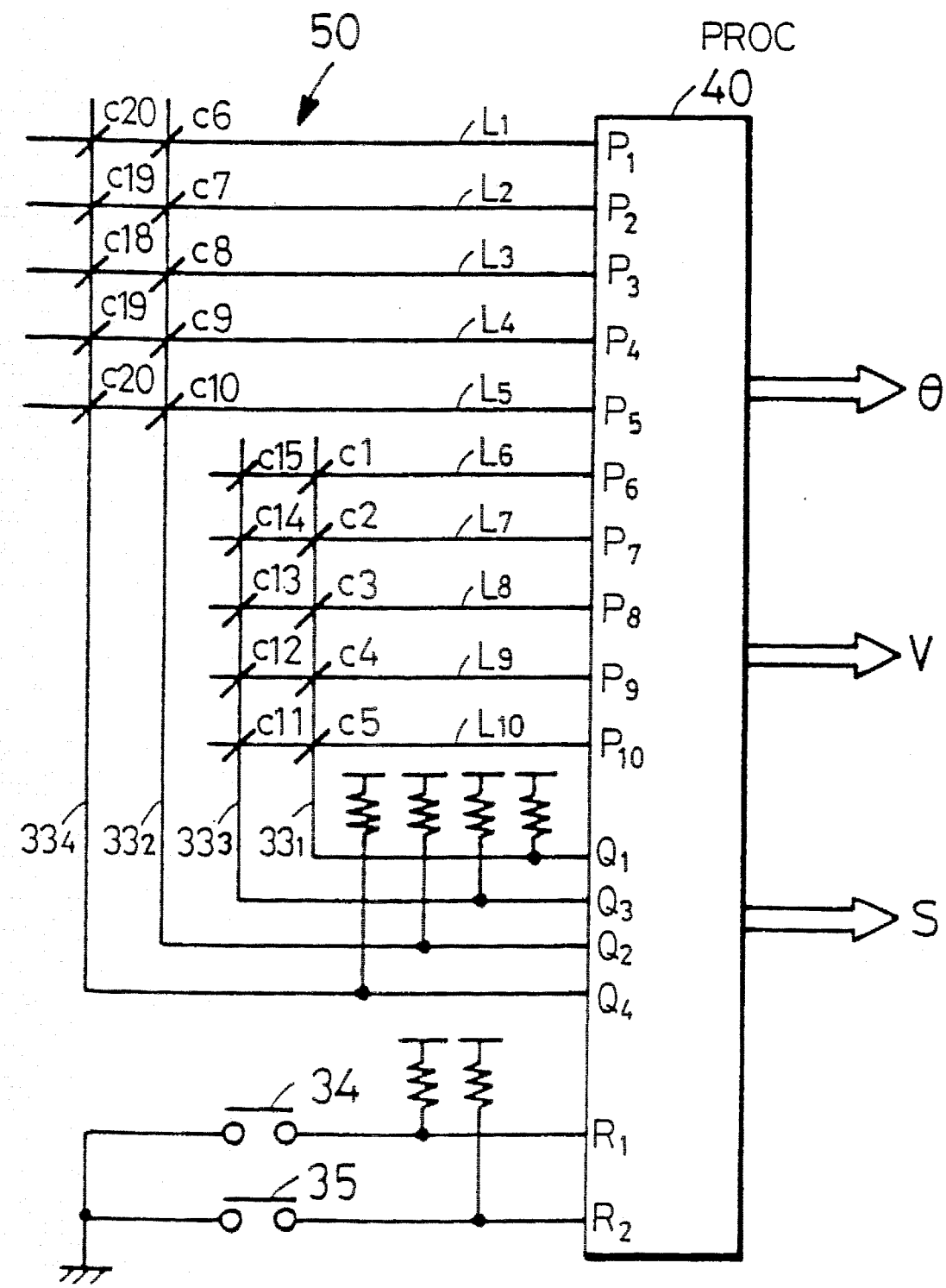
FIG. 13 is a diagram of a matrix circuit arranged according to the pattern in FIG. 12.

A matrix switch circuit 50 as illustrated in FIG. 13 may be constituted by forming membrane switches according to the pattern of contacts and connection wiring as described with respect to FIG. 12. The symbols c1–c20 indicating the strip contacts in FIG. 12 are used to designate the switches formed by those contacts in FIG. 13.

In FIG. 13 three adjoining switches c2, c3 and c4 which may possibly simultaneously be turned on as operated by the control key are taken as an example for discussion. The following discussion will be given in the same manner as discussed with respect to FIG. 10. If the switch c1 is turned on when a signal is present at the output $P_6$ in FIG. 13, that signal will appear at the input $Q_1$ whereby the switch c1 is recognized as being on. Let it here be assumed that the three switches c2, c3 and c4 are simultaneously on. In this case, however, as long as the switch c1 is off, no ghost key will emerge because of the switching arrangement illustrated in which the common connection lines $L_6$–$L_9$ for these four switches c1, c2, c3, c4 are independent of each other; for even if there is present a signal at the output $P_6$, there would be no sneak circuit formed through which that signal would be passed from the common connection line $L_6$ by way of the switches c2, c3 and c4 which are simultaneously in the on state. By the way, if the oppositely positioned switch c15 was depressed simultaneously with pressing the switch c1 on, that would naturally cause a malfunction. But actually, the oppositely positioned switches c1 and c15 cannot be simultaneously depressed since the control key 21 is supported from below at the center of its undersurface by the support pin 16.

The foregoing is true with any three adjoining switches which may possibly simultaneously be turned on. And any pair of oppositely positioned switches cannot be simultaneously pressed on.

When software for table calculations, for example, is processed in a computer, generally the cursor is frequently traversed in vertical and horizontal directions over a table composed of ruled lines appearing on the display screen. It has been statistically found out that the number of times the cursor is traversed vertically and horizontally on the display screen is much greater than the frequency at which it is moved obliquely. In order to insure that the cursor is traversed accurately and reliably in vertical and horizontal opposite directions, it is required that only one of the four vertically oppositely extending and horizontally oppositely extending strip contacts 30 in the contact pattern shown in FIG. 12 be selectively maintained in contact with the associated grouping contact 31. In this regard, however, the strip contacts 30 arranged in an annular array in the membrane switch of FIG. 12 are all equal in width and extend radially in all directions at equal circumferential spacings. Consequently, the controllability of the direction and speed of movement of the cursor is equal, with substantially no difference, in every radial direction. In view of this, a modified embodiment of the contact and wiring pattern for the membrane switches shown in FIG. 12 is illustrated in FIG. 14 which is configured to facilitate the control of traversal of the cursor particularly in vertical and horizontal directions.

Figure 14:
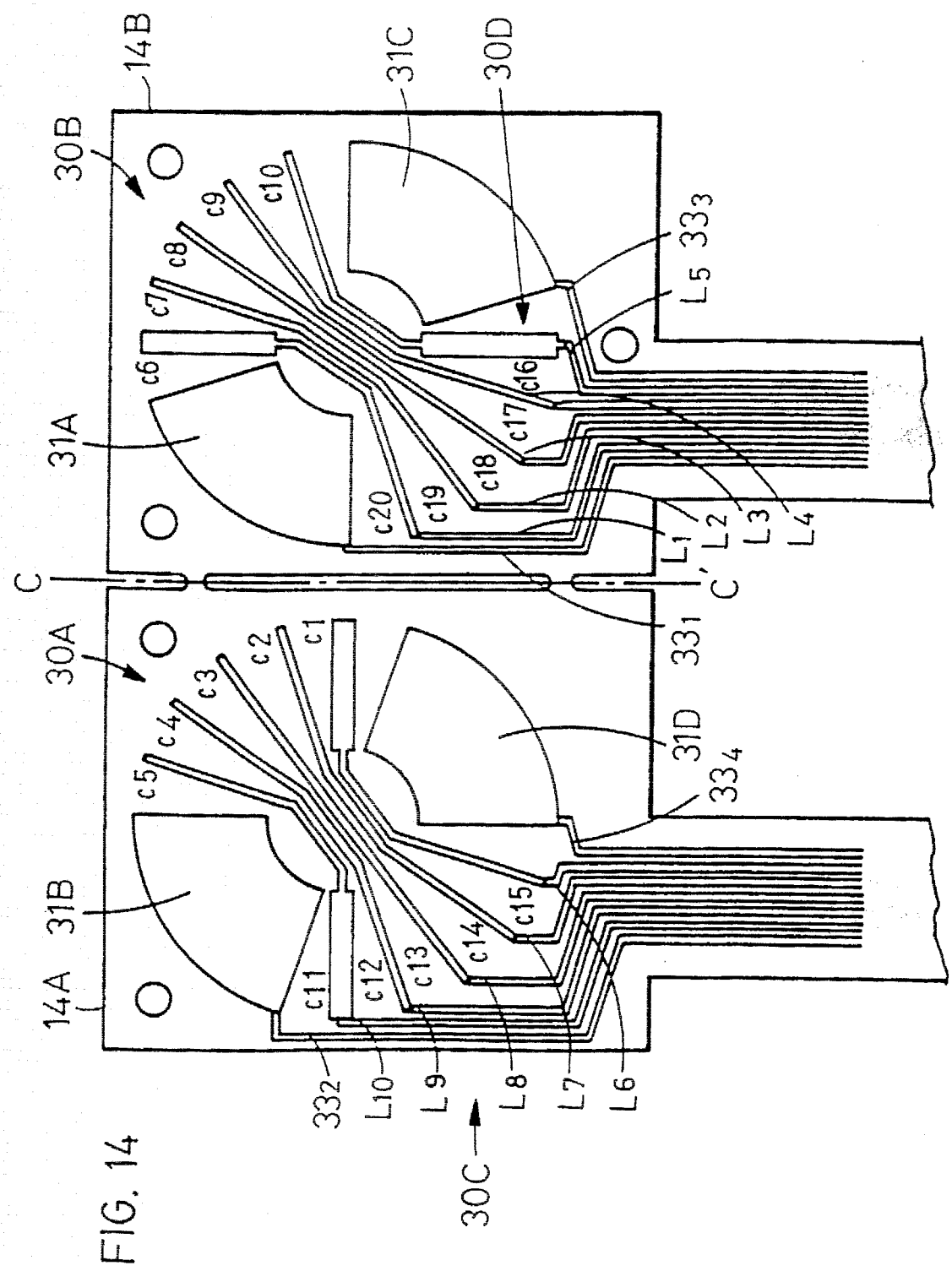
FIG. 14 is a diagram of a modified form of the contact wiring pattern comprising a matrix circuit.

The contact and wiring pattern shown in FIG. 14 is identical to that illustrated in FIG. 12 except that the vertically and horizontally extending strip contacts corresponding to the cursor movements in vertical and horizontal directions, respectively are made wider in contact width than the other strip contacts. Specifically, in FIG. 14 the strip contacts c1 and c11 extend horizontally oppositely and are in association with movements of the cursor in a horizontal direction while the strip contacts c6 and c16 extend vertically oppositely and are in association with movements of the cursor movements in a vertical direction. These particular strip contacts c6, c16, c1, c11 are made wider in contact width than the other strip contacts. Preferably, those particular strip contacts are 1.5 to 2 times as wide as the other strip contacts.

In operation of the input control device utilizing membrane switches formed according to the contact and wiring pattern shown in FIG. 14, when the vertically and horizontally oppositely extending strip contacts are operatively depressed by the control key 21, those strip contacts, relatively wide in contact width, are advantageously more unlikely to be disengaged from the associated grouping contacts 31 as compared with the other strip contacts having a normal width, even though the location at which the control key is depressed is somewhat offset widthwise from the desired strip contact 30. Making the particular strip contacts about 1.5 to 2 times as wide as the other strip contacts may facilitate the traversals of the cursor in vertical and horizontal directions without interfering with the cursor movements in the other directions.

It is here to be noted that in the embodiment of the input control device 10 shown in FIG. 7 the operator needs to use both of his or her hands to operate the control key 21 and the click keys 34 and 35 as they are spaced apart from each other. Even if the control key 21 and the click key 34 or 35 are located within reach of the fingers of one hand, it is required to move one hand to operate both of the control key and either one of the click keys, or it is very difficult to handle both keys with one hand. In addition, arranging the control key and the click keys in spaced-apart relation requires a correspondingly increased space in a plan view.

Figure 15A:
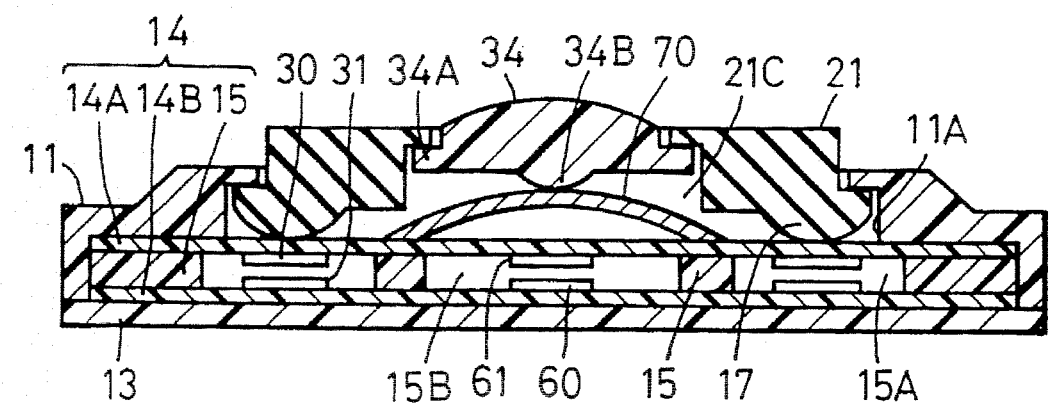
FIG. 15A is a cross-sectional view of an embodiment of the input control device having a click key in a control key.
Figure 15B:
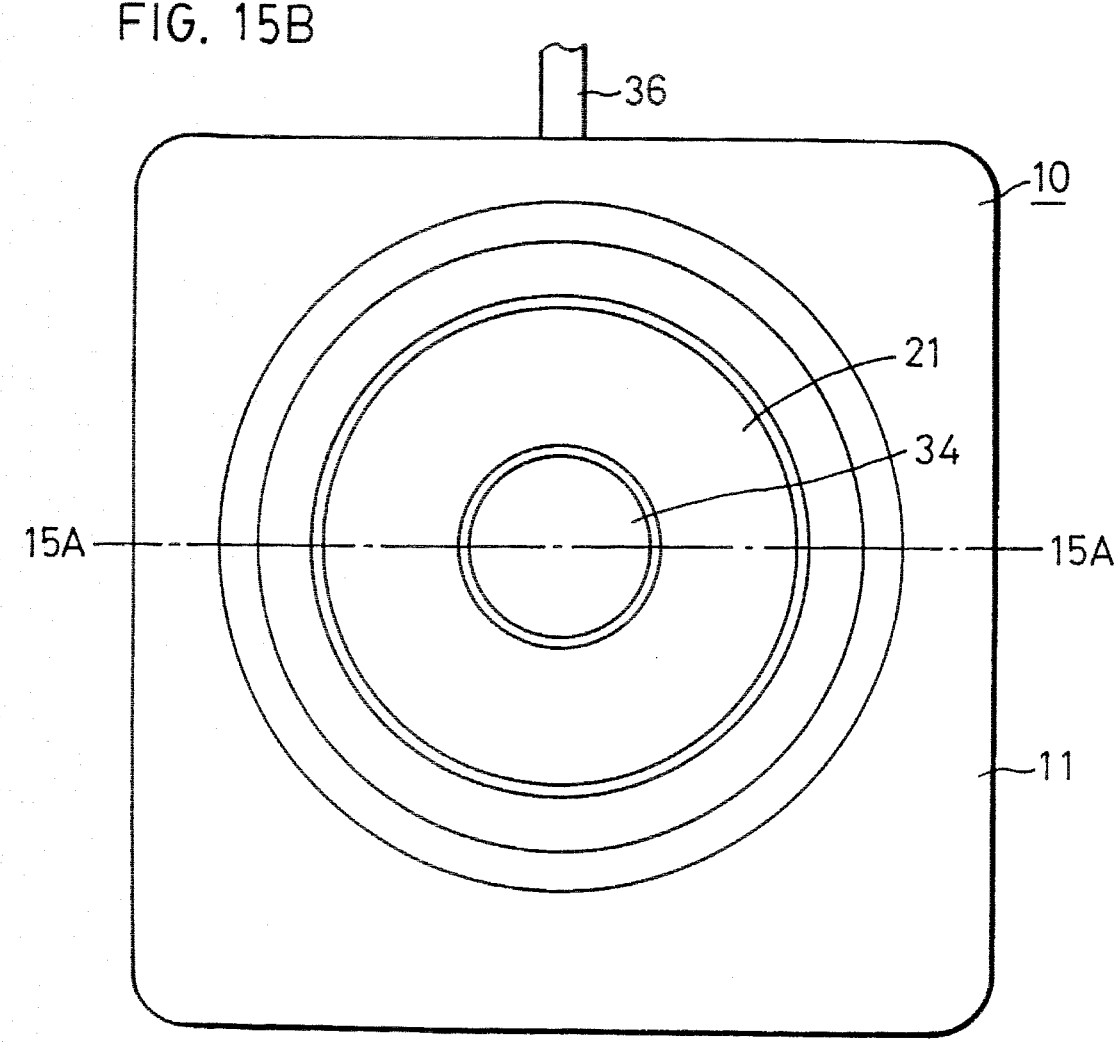
FIG. 15B is a plan view of the input control device in FIG. 15A.

FIGS. 15A and 15B shows an embodiment of the input control device designed to overcome this problem which can be operated with only one hand and which provides an improved space factor.

FIG. 15A is a cross-sectional view taken on line 15A—15A in FIG. 15B while FIG. 15B is a plan view of FIG. 15A. In FIG. 15A, strip contacts 30 are formed on insulation layers 14A and 14B by printing, and likewise grouping contacts 31 are formed in insulation layers 14A and 14B by printing. Interposed between the insulation layers 14A and 14B is a spacer 15 which is shown as having an extremely exaggerated thickness for the purpose of clarity of depiction but is actually as thick as or thinner than the insulation layers 14A, 14B. The insulation layers 14A, 14B and the spacer 15 form a membrane switch sheet 14 comprising membrane switches.

Figure 16:
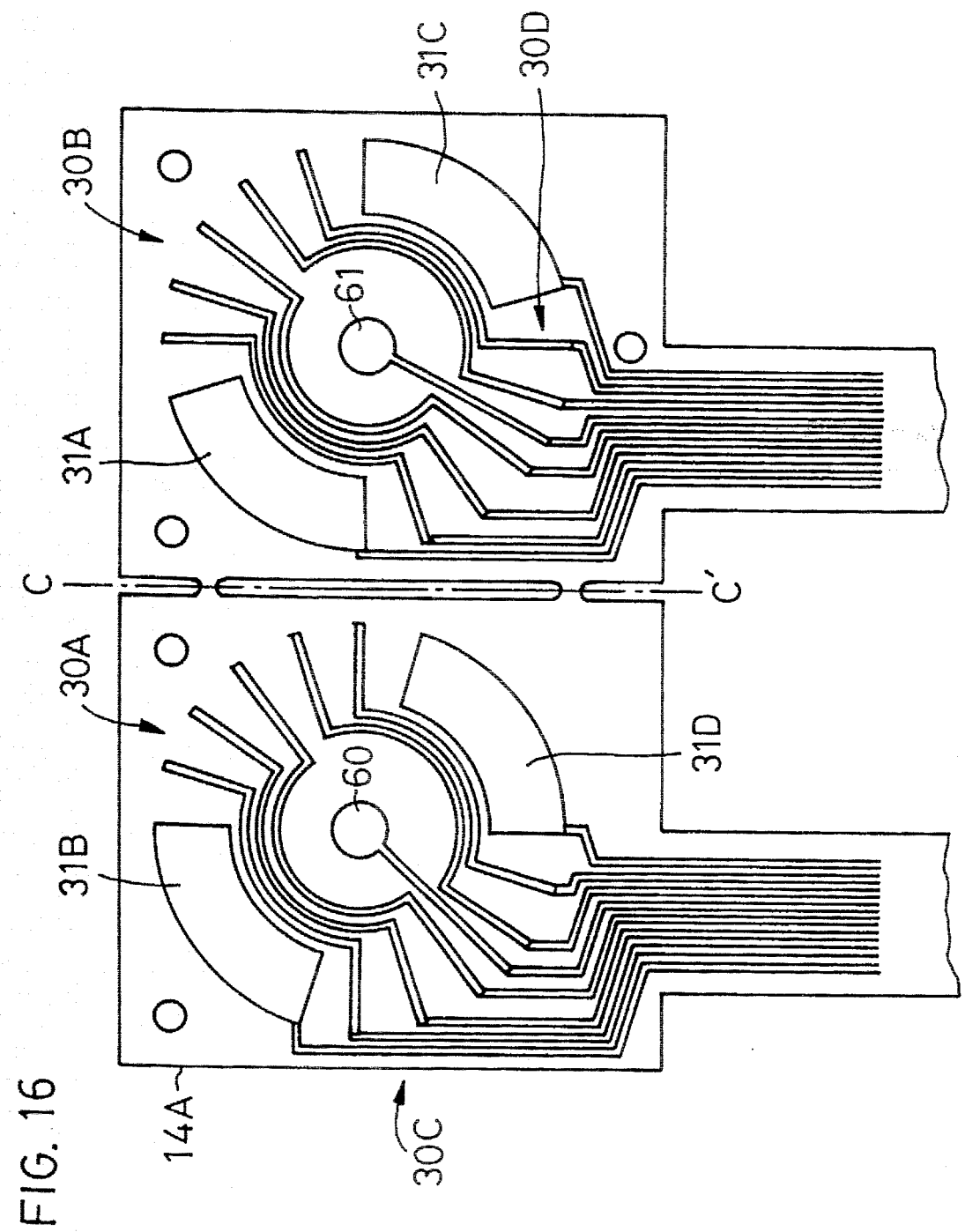
FIG. 16 is a diagram of the contact wiring pattern for use with the input control device in FIG. 15A.

The spacer 15 has a central circular space 15B and a concentric outer annular space 15A very low in height formed by punching out the spacer 15. The strip contacts 30 and grouping contacts 31A–31D are located in opposed position within the confines of the annular space 15A, as shown. These strip contacts 30 and grouping contacts 31A–31D are formed on the insulation sheet 14A, 14B as shown in FIG. 16 such that they are opposed to each other when the sheet is folded on itself along a line C–C'. The strip contacts 30 are connected with each other and with common connection lines in the same manner as illustrated in FIG. 12. In this embodiment a movable click contact 60 and a fixed click contact 61 are formed in opposed relation on the insulation layers 14A and 14B, respectively.

Mounted in a circular aperture 11A formed through a top panel 11 is a circular input control key 21 constituting an input control means, and an annular elastic member 17 is disposed on the undersurface of the control key 21. The control key 21 has a central opening 21C formed therethrough in which a click key 34 is accommodated. The click key 34 has a peripheral flange 34A extending from the periphery thereof adjacent the undersurface thereof by which flange the click key is prevented from coming off the aperture 21C. A spherically curved invertible plate or leaf 70 is placed on the membrane switch sheet 14 underneath the click key 34 in the click key accommodating aperture 21C. The click key is supported from below by a drive protuberance 34B extending from the center of the undersurface of the click key.

By operatively depressing the input control key 21 it is possible to produce angle signals and velocity signals depending on the direction in which the key has been depressed and the magnitude of force applied to the key as in the embodiments of FIGS. 5 and 8. Further, upon depressing the click key 34 until the stroke of depression exceeds a certain point, the invertible plate 70 is inverted, that is bent downwardly to urge the movable click contact 60 into contact with the fixed click contact 61 whereby a condition setting signal may be produced. Upon the click key 34 being released, the invertible plate 70 restores itself to its normal position to push the click key 34 back up.

According to this embodiment, both the input control key 21 and the click key 34 are located within reach of the fingers of one hand, so that one hand operation of the two keys is facilitated, thereby enhancing the operability of the input control device. In addition, the arrangement in which the two keys are concentrically mounted greatly improves the space factor with respect to the horizontal extent of the input control device.

The disk-like control key 21 as described with respect to FIGS. 5 and 8 is of the type having an integral control lever 20 upstanding from the center thereof such that a horizontal drive force may be applied to the control lever 20. This control key 21 converts the horizontal drive force applied to the control lever 20 into a vertical force to thereby operatively depress the membrane switches vertically. Since the control key 21 is supported from below to insure stable operation, the various contacts of the membrane switches as well as the control key 21 may be reduced in diameter, as compared to the control key 21 of the type having no control lever 20 and designed to be directly pressed. The reduced diameter of the control key is advantageous in incorporating the control key of this type in a keyboard for a computer since it improves the space factor of the computer keyboard. Furthermore, the control key of the type having a control lever 20 to which a horizontal drive force is to be applied provides a better operability in that the vertical depression of the membrane switch may be accomplished by a horizontal drive force through only a short stroke applied to the control lever 20 by hand fingers.

Figure 17:
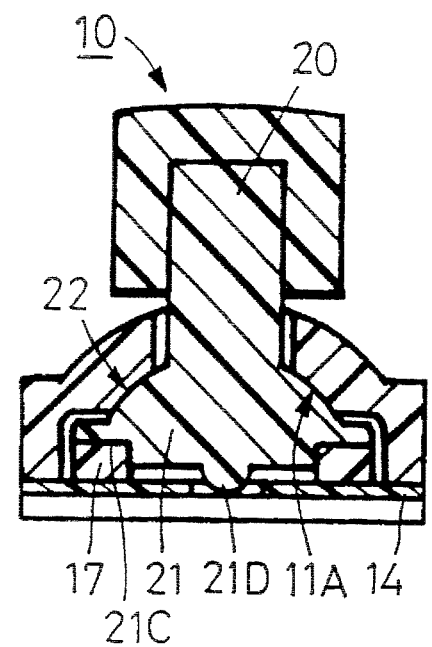
FIG. 17 is a cross-sectional view of another embodiment of the input control device according to this invention.

FIG. 17 shows yet another embodiment of the input control device according to this invention comprising a combination of a control key 21 having a control lever 20 as illustrated in FIG. 1 and membrane switches as illustrated in FIGS. 6, 12 and 14 in which the spherical surface 22 of the control key 21 is in slidable engagement with the inner spherical wall of an aperture 11A.

In FIG. 17, the control lever 20 extends integrally from the center of the top surface of the control key 21. The top panel 11 has an aperture 11A formed therethrough defining a spherical concave recess downwardly decreasing in diameter in which the control key 21 is accommodated, the top of the control key 21 having a spherical convex surface 22 mating with the spherical concave recess.

The control key 21 has a slightly elastic protuberance 21D extending from the undersurface thereof. The protuberance 21D is adapted to abut against the backing plate 13 to thereby support and bias the control key 21 upwardly to urge the spherical convex surface 22 against the spherical concave recess 11A. The control key 21 further has an annular recess 21C formed in the undersurface thereof around its periphery in which is mounted an annular elastic member 17 made of an elastic material such as rubber or synthetic resin.

Upon operating the control lever 20 horizontally, a pressure is applied through the control key 21 and the annular elastic member 17 to the membrane switch sheet 14 to thereby bring the underlying grouping contacts 31A–D and strip contacts 30 into contact with each other.

The switch matrix in the form of membrane switches in this embodiment is identical both in its manufacturing process and in its finished configuration and construction to a keyboard switch for use with a computer or computer equipment, so that the switch matrix may be produced concurrently with fabricating such keyboard switch and integrally with the keyboard switch.

Figure 18A:
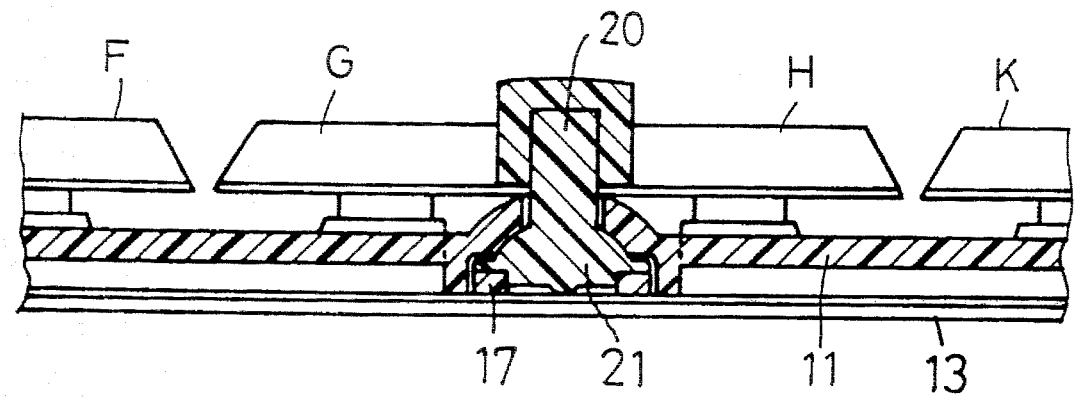
FIG. 18A is a cross-sectional view of the input control device of FIG. 17 mounted in a keyboard.
Figure 18B:
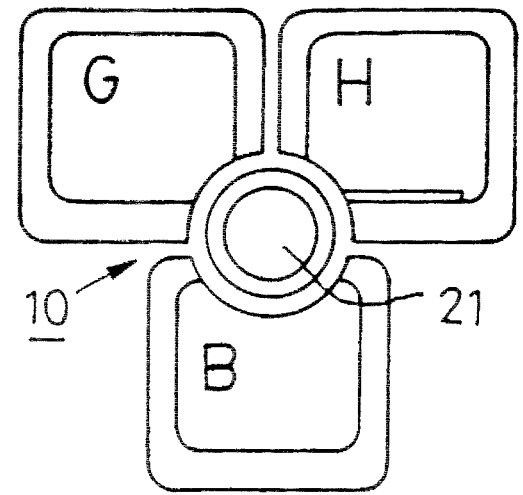
FIG. 18B is a plan view of the input control device in FIG. 18A.

An example of a keyboard incorporating the input control device according to this invention including the membrane switch sheet 14 will now be described with reference to FIGS. 18A, 18B, 19 and 20. FIGS. 18A and 18B show an input control device 10 identical to that shown in FIG. 17 mounted in a keyboard. In FIG. 18B, the input control device 10 is surrounded by three keys G, H and B.

However, with the input control device of the type having a control key 21 adapted to be operated by pressing directly on the top surface thereof, the control key should have a substantially large diameter, so that the control key may not be located within the array of the keyboard keys. For this reason, the top panel 11 of the input control device 10 is formed as an extension of the keyboard extending from the forward edge thereof in which extension the control key 21 and click keys 34, 35 are mounted, as shown in FIG. 19.

Figure 20:
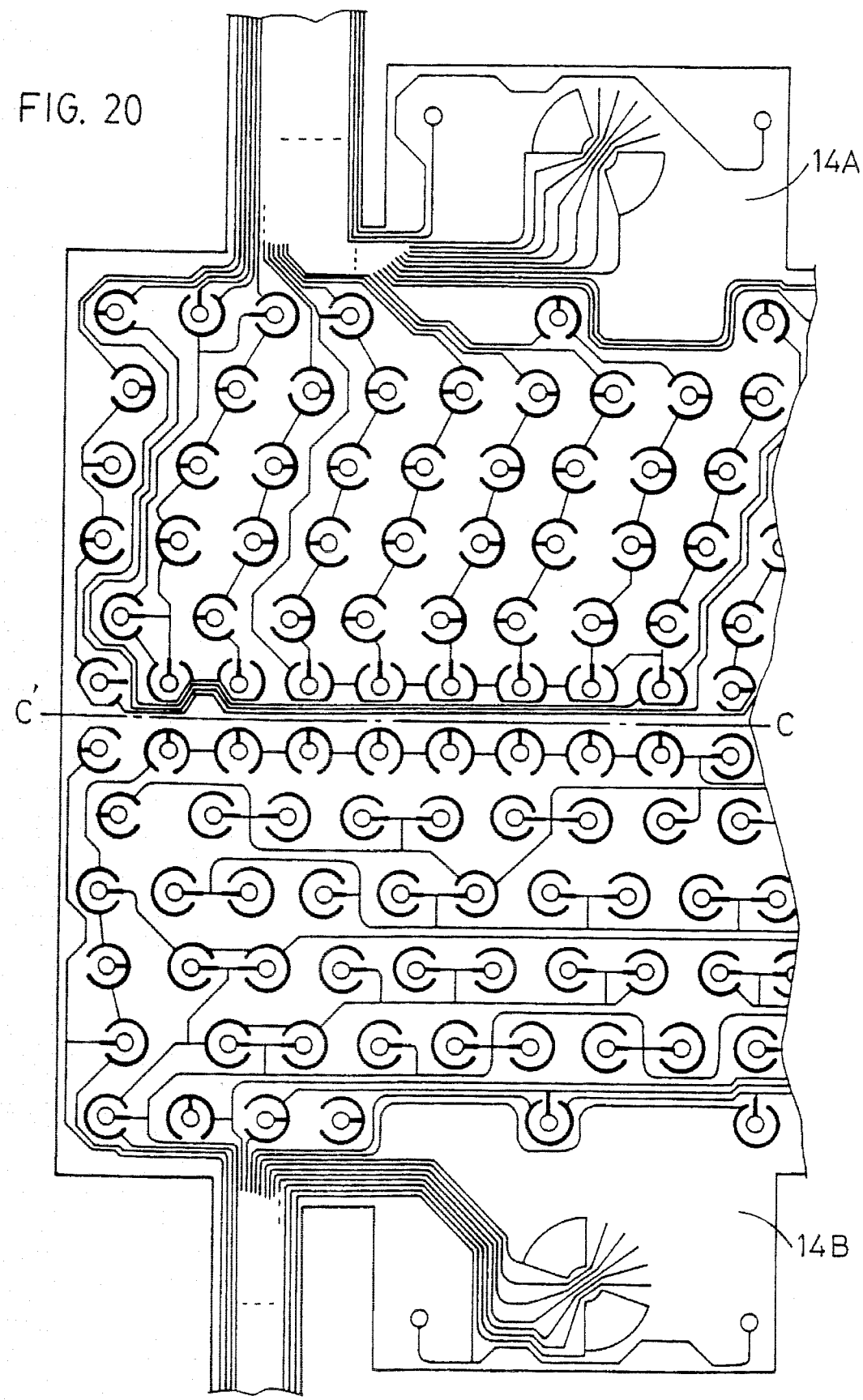
FIG. 20 is a diagram showing a printed contact wiring pattern for use in a unitary membrane switch sheet in which the keyboard switch and the switch matrix for the input control device are integrated as one piece.

FIG. 20 is a diagram showing a printed contact and wiring pattern formed on an insulation sheet 14A, 14B for forming membrane switches for the keyboard and the input control device 10, both shown in FIG. 19, in an integrated structure.

The insulation sheet 14A, 14B shown in FIG. 20 is folded in two layers along a line C–C' with a spacer 15 sandwiched between the two layers 14A and 14B to form the membrane switches for the keyboard and the membrane switches for the input control device as one piece. This one-piece keyboard/input control device membrane switch sheet 14 is mounted underneath the keytops of the keyboard and the control key as shown in FIG. 19.

The switch matrix constituted by membrane switches according to this invention is identical both in its manufacturing process and in its finished configuration and construction to a keyboard switch for a computer or computer equipment, so that this switch matrix may be manufactured concurrently with fabricating such a keyboard switch and integrally with the keyboard switch. Accordingly, the control key of the input control device may easily be arranged among keytops of a keyboard for a computer or computer equipment such that the switch martix may be operated by the use of the control key. It is thus to be appreciated that a computer or computer equipment incorporating the input control device may be easily manufactured.

In wordprocessors, car navigation systems, game machines and other equipment using a computer, when the cursor is traversed by the use of the input control device according to the various embodiments of this invention described above, the input control device generally provides a single-rate output to the computer equipment with respect to the rate at which the cursor is to be moved. That is, the information about the speed of operation of the control key 21 as obtained by operatively depressing the matrix switch circuit 50 is recognized by the arithmetic processor 40, and the recognized amounts of horizontal operation and vertical operation are converted to electric signals fitting the communication standard on the input control device, which electric signals as such are transmitted as velocity signals to the computer equipment.

It should here to be noted that there are generally proper rates of cursor traversal depending on the type of computer equipment. For instance, wordprocessors, car navigation systems, and game machines differ in their suitable rates of cursor traversal. It is noted that the rate of cursor traversal may be uniform irrespective of the type of computer equipment. Taking the wordprocessor by way of example, the proper rate of cursor traversal may be different depending on individuals. The higher rate of traversal is convenient for skilled operators while the lower rate of traversal is suitable for beginners.

Figure 21:
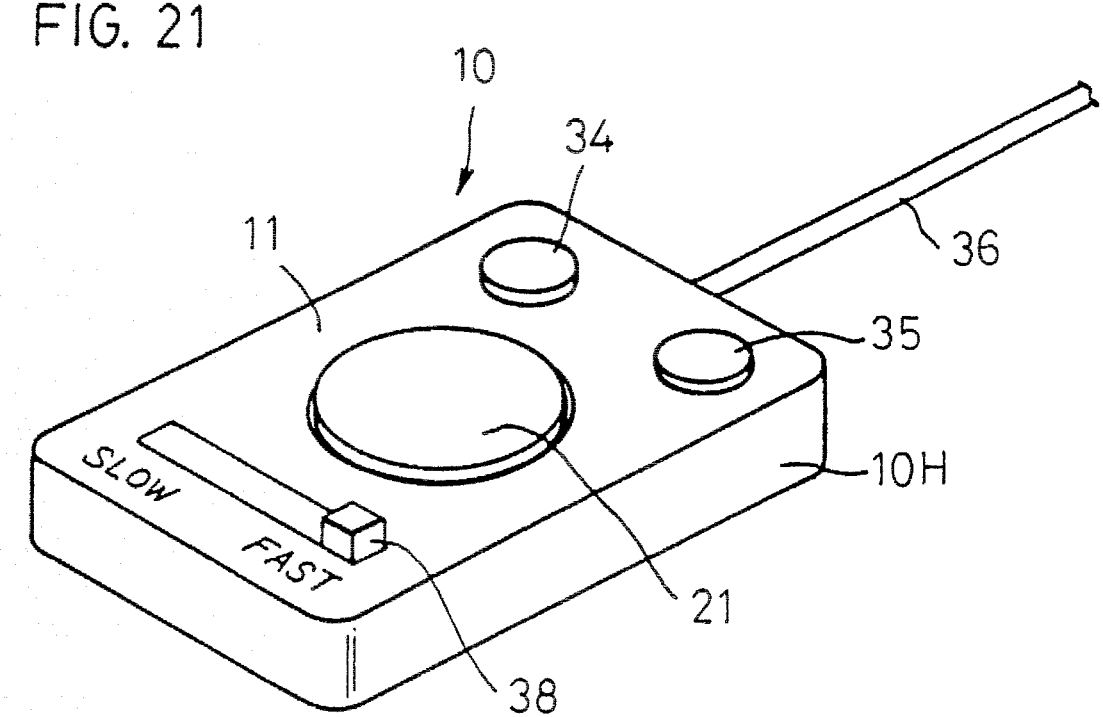
FIG. 21 is a perspective view showing the outer appearance of an input control device in which a speed selector switch 37 is incorporated.
Figure 22:
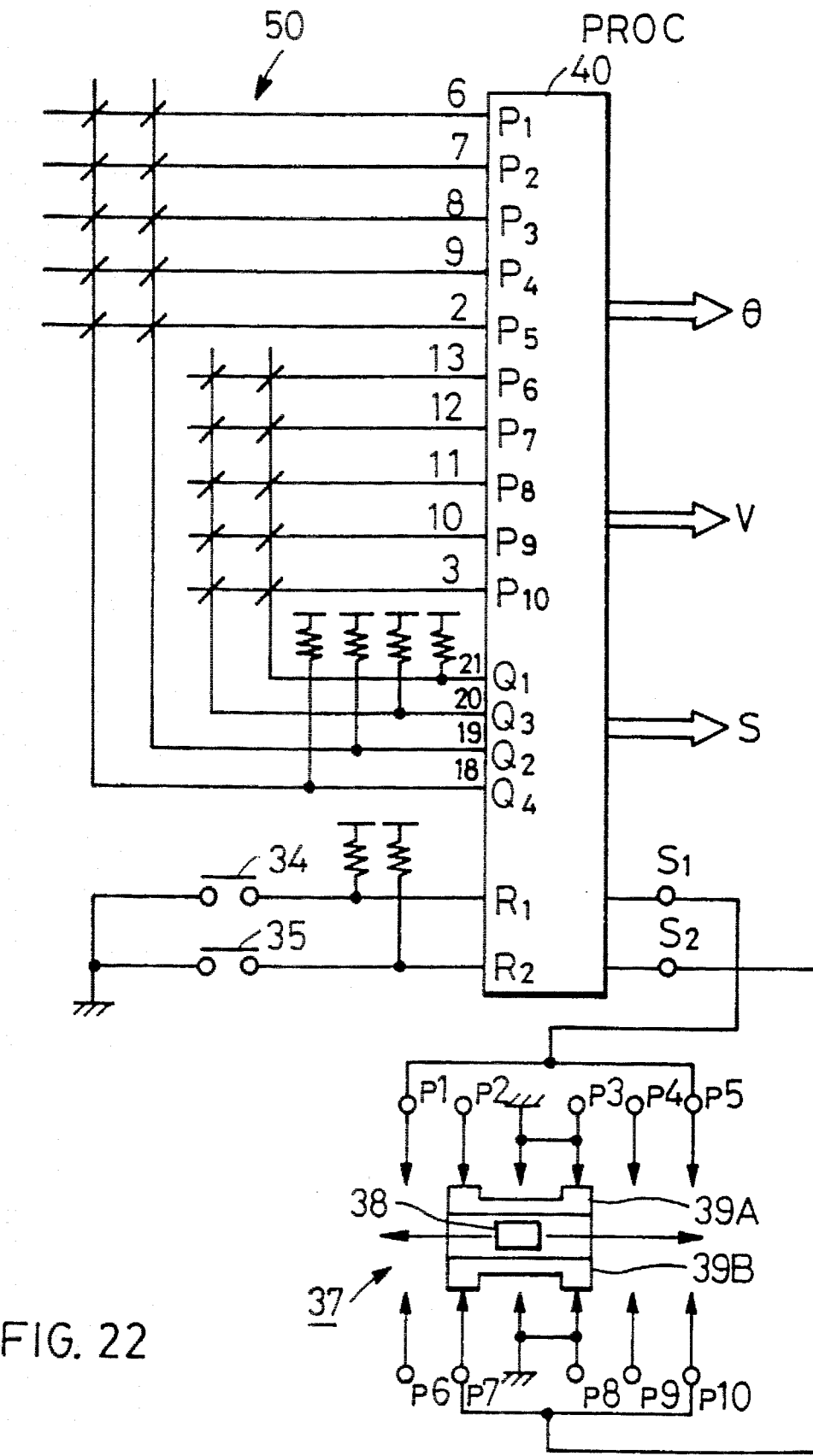
FIG. 22 is a diagram showing the construction of the speed selector switch 37 in FIG. 21 and the connection of the switch with an arithmetic processor 40.

A modified embodiment of the input control device 10 according to this invention similar to that shown in FIG. 7 but improved from the foregoing viewpoint is illustrated in FIG. 21. The input control device 10 shown in FIG. 21 is identical to that shown in FIG. 7 in that a control key 21 and click keys 34 and 35 are provided in the top panel 11 defining the top wall of a housing 10H. Mounted in the housing 10H are a matrix switch circuit 50 and a processor 40, shown in FIG. 22. The processor 40 comprises an operational amount determining section for recognizing the amount of depressive operation against the matrix switch circuit to determine the operational amount of the depressive control means, an operational amount change circuit means for changing the operational amount output from the operational amount determining section, and a signal generator for converting the output of the change circuit means to velocity and angle signals to be transmitted to computer equipment.

In this embodiment an alteration circuit means or selector switch 37 for changing the operational amount is connected through a pair of speed selecting terminals $S_1$ and $S_2$ to the processor 40. An actuator 38 for the selector switch 37 extends upwardly through the top panel 11 of the housing 10H. Slidable contacts 39A and 39B are slidably actuated in interlocking relation by the actuator 38 so as to selectively bridge fixed contacts p1–p10. The contacts p1 and p5 are connected with each other and with the speed selecting terminal $S_1$ while the contacts p7 and p10 are connected with each other and with the speed selecting terminal $S_2$. The contacts p3 and p8 are grounded.

The speed selecting terminals $S_1$ and $S_2$ may be changed in their states in the following four ways by operating the actuator 38:

| Bridged fixed contacts | States of $S_1$ | States of $S_2$ |
| --- | --- | --- |
| p1–p3 | Grounded | |
| p6–p8 | | Floating |
| p2–p3 | Floating | |
| p7–p8 | | Grounded |
| p3–p4 | Floating | |
| p8–p9 | | Floating |
| p3–p5 | Grounded | |
| p8–p10 | | Grounded |

In this way, the alteration circuit means 37 for changing the operational amount acts to stepwisely change the operational amount of the depressive control means as determined by the operational amount determining section, in response to the states of the speed selecting terminals $S_1$ and $S_2$ set by the sliding operation of the actuator 38. That is, the operational amount of the depressive control means as determined by the operational amount determining section is not transmitted as such, but the operational amount stepwisely changed is transmitted to the computer equipment. The adoption of this input control device in moving the cursor for wordprocessors, game machines and other equipment using a computer permits selection of the proper rate of cursor traversal depending on the type of computer equipment as well as the rate of cursor traversal suitable for individuals, whereby the operating efficiency of computer equipment may be enhanced.

We claim:

1. An input control device comprising:
    a fixed first insulation surface and a second insulation surface disposed in opposed position to the first insulation surface so as to be movable toward selective portions of the first insulation surface;
    M arcuate grouping contacts arranged selectively on said first and second insulation surfaces in an annular array, M being an integer equal to or greater than 2;
    M groups of strip contacts disposed in opposed relation to said corresponding M arcuate grouping contacts, respectively, and arranged selectively on said first and second insulation surfaces, each group containing a plurality of said strip contacts extending radially and electrically separated from one another when said strip contacts are out of contact with corresponding ones of said M arcuate grouping contacts;

a control key means disposed in opposed relation to said annular array on the side of said second insulation surface opposite from said first insulation surface;

retaining means for retaining said control key means for tilting movements generally on the center of said annular array with respect to said first insulation surface; and elastic means disposed between said control key means and said second insulation surface in opposing relation to said annular array for providing an elastic force in opposition to an operating force applied to the control key means, said elastic force acting to press a portion of said second insulation surface in said annular array against said first insulation surface, an area of said portion being dependent on deformation of said elastic means caused by said operating force, whereby one of said M arcuate grouping contacts corresponding to the direction of the operating force applied to said control key means is brought into contact with one or more of said strip contacts depending on the magnitude of the operating force.

2. The input control device of claim 1 wherein wiring means is connected to said M arcuate grouping contacts and said M groups of strip contacts such that the opposed grouping contacts and groups of strip contacts comprise a switch matrix.

3. The input control device of claim 2 wherein said control key means includes a control key formed of an elastic insulation material integrally with said elastic means, said second insulation surface being defined by an undersurface of said control key disposed in opposed relation to said first insulation surface.

4. The input control device of claim 2 wherein said first and second insulation surfaces are defined by a fixed first insulation layer and a second insulation layer, respectively, said second insulation layer being in opposed spaced relation to said first insulation layer, spacer means being disposed between said first and second insulation layers and having an annular space accommodating said opposed groups of strip contacts and grouping contacts.

5. The input control device of claim 4, wherein said M arcuate grouping contacts are formed on one of said first and second insulation layers, said M groups of strip contacts being formed on the other, of said first and second insulation layers.

6. The input control device of claim 4 wherein said M grouping contacts are formed on said first and second insulation layers alternately in an annular array so that M/2 grouping contacts and M/2 groups of strip contacts are alternately arranged on said first insulation layer to define a first annular array of contacts while the remaining M/2 grouping contacts and the remaining M/2 groups of strip contacts are alternately arranged on said second insulation layer to define a second annular array of contacts.

7. The input control device of claim 6 wherein said first and second annular arrays of contacts are formed in the same pattern on a common insulation sheet, which is folded on itself to define said first and second insulation layers so that the first and second annular arrays of contacts having the same pattern are in opposed relation to each other.

8. The input control device of claim 5 wherein said elastic means includes an annular elastic member positioned in facing relation to said annular space between the undersurface of said control key means and said second insulation layer.

9. The input control device of claim 8 wherein a support means for rotatably supporting said control key means is provided at the center of the undersurface of the control key means.

10. The input control device of claim 8 wherein said annular elastic member extends from the undersurface of said control key means toward said annular space and has an annular ridge in opposed spaced relation to said second insulation layer when the control key means is in its neutral position and a skirt portion extending outwardly and obliquely downwardly from the upper end of the ridge, the lower end of said skirt potion lying closer to said second insulation layer than the lower end of the ridge when said control key means is in its neutral position.

11. The input control device of claim 10 wherein said skirt portion extends beyond the outer diameter of said control key means.

12. The input control device of claim 5 wherein M is equal to 4, each of four groups of strip contacts containing an equal number of strip contacts, said strip contacts being arranged at equal angular intervals in an annular array on said other of the first and second insulation layers, and said wiring means connecting each set of four strip contacts positioned symmetrically with respect to two orthogonal axes separating the strip contacts into said four groups.

13. The input control device of claim 6 wherein M is equal to 4, each of four groups of strip contacts containing an equal number of strip contacts arranged at equal angular intervals circumferentially of said circle, and said wiring means connecting each pair of correspondingly positioned strip contacts of two groups of strip contacts on said first insulation layer and connecting each pair of correspondingly positioned strip contacts of the remaining two groups of strip contacts on said second insulation layer.

14. The input control device of claim 5 or 6 wherein two of the strip contacts on a first axis passing through the center of said circle and two of the strip contacts on a second axis orthogonal to the first axis are made wider in circumferential width than the other strip contacts.

15. The input control device of claim 14 wherein the circumferential width of the strip contacts on said first and second axes are 1.5 to 2 times as large as that of the other strip contacts.

16. The input control device of claim 4 wherein said control key means has an upper surface and a control lever upstanding from the upper surface.

17. The input control device of claim 4 wherein said control key means has a generally flat upper surface.

18. The input control device of claim 17 wherein said control key means has a central click key accommodating aperture formed therethrough in which a click key having a drive protuberance extending downwardly from the center of the undersurface of the click key is movably held, a spherically curved invertible plate being placed in abutment against said protuberance between the click key and said second insulation layer to bias the click key upwardly, said spacer means having a central space formed therethrough in opposed relation to said protuberance inside of said annular space, and first and second click contacts being formed oppositely on said first and second insulation layers within said central space.

19. The input control device of claim 17 including a top panel disposed in opposed position to said second insulation layer, said retaining means comprising an accommodating aperture formed in said top panel and having an enlarged diameter on the side of said second insulation surface.

20. The input control device of claim 19 wherein said accommodating aperture defines a spherical concave recess, said control key having a spherical convex upper surface, and said elastic means comprising an annular elastic member disposed between the undersurface of said control key means and said second insulation layer in opposed relation with said grouping contacts and strip contacts.

21. The input control device of 2, 3 or 4, including an arithmetic processor connected to said wiring means, said processor being adapted to detect one or more switches of said switch matrix and to thereby determine the direction and magnitude of an operating force applied to said control key means and generate corresponding direction and velocity signals.

22. The input control device of claim 21, including a selector means for transmitting a selection signal to cause said arithmetic processor to change said velocity signal at a predetermined rate.

* * * * *